US008219768B2

(12) United States Patent
Nishibori et al.

(10) Patent No.: US 8,219,768 B2
(45) Date of Patent: Jul. 10, 2012

(54) SYSTEM AND METHOD FOR ESTABLISHING A COPY PAIR RELATIONSHIP BETWEEN SOURCE AND DESTINATION VOLUMES

(75) Inventors: Tatsuo Nishibori, Odawara (JP); Akira Murotani, Odawara (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 12/669,167

(22) PCT Filed: Jan. 5, 2010

(86) PCT No.: PCT/JP2010/000029
§ 371 (c)(1),
(2), (4) Date: Jan. 14, 2010

(87) PCT Pub. No.: WO2011/083507
PCT Pub. Date: Jul. 14, 2011

(65) Prior Publication Data
US 2011/0167234 A1    Jul. 7, 2011

(51) Int. Cl.
*G06F 12/16*    (2006.01)
(52) U.S. Cl. ...................................................... 711/162
(58) Field of Classification Search ........................ None
See application file for complete search history.

(56) References Cited

U.S. PATENT DOCUMENTS

| | | | |
|---|---|---|---|
| 6,457,109 B1* | 9/2002 | Mililo et al. ................ | 711/162 |
| 2003/0014534 A1 | 1/2003 | Watanabe et al. | |
| 2004/0193795 A1* | 9/2004 | Takeda et al. ................ | 711/113 |
| 2004/0205309 A1* | 10/2004 | Watanabe ..................... | 711/161 |
| 2006/0015697 A1* | 1/2006 | Morishita et al. ............ | 711/162 |
| 2006/0047776 A1* | 3/2006 | Chieng et al. ................ | 709/217 |
| 2006/0248296 A1* | 11/2006 | Ninose et al. ................ | 711/162 |
| 2007/0226439 A1 | 9/2007 | Hasegawa | |
| 2007/0233978 A1 | 10/2007 | Nakano et al. | |
| 2007/0277012 A1 | 11/2007 | Hara et al. | |

(Continued)

FOREIGN PATENT DOCUMENTS

EP    1 868 098    12/2007

(Continued)

OTHER PUBLICATIONS

International Search Report in International Application No. PCT/JP2010/000029 mailed on Jul. 14, 2010.
Written Opinion in International Application No. PCT/JP2010/000029 mailed on Jul. 14, 2010.

*Primary Examiner* — Kaushikkumar Patel
(74) *Attorney, Agent, or Firm* — Brundidge & Stanger, P.C.

(57) ABSTRACT

A replication system capable of automatically forming an authentic copy pair with a primary volume at a copy destination system without depending on an operator and realizing the pair formation without labeling a tape is provided.
A system for performing initial copying of data of a copy source volume from a portable storage medium storing the data of the copy source volume to a copy destination volume is characterized in that the portable storage medium stores management information about the copy source volume, wherein a system to which the copy destination volume belongs copies data of the portable storage medium to copy destination volume information, reads the management information from the copy destination volume, and sends it to a system to which the copy source volume belong; and this system judges whether these pieces of information are authentic or not; and if an affirmative judgment is returned, it is determined that the copy source volume and the copy destination volume constitute an authentic copy pair.

15 Claims, 18 Drawing Sheets

U.S. PATENT DOCUMENTS

2008/0133856 A1* 6/2008 Ontko .......................... 711/162

FOREIGN PATENT DOCUMENTS

| | | |
|---|---|---|
| JP | 11-102262 | 4/1999 |
| JP | 2004-342050 | 12/2004 |
| JP | 2007-241848 | 9/2007 |
| JP | 2007-317186 | 12/2007 |
| JP | 2008-129723 | 6/2008 |

* cited by examiner

FIG. 2

| Block Address | COW Bitmap | V1 | V2 | ... | Vn |
|---|---|---|---|---|---|
| 0 | 00...00 | 0 | 0 | ... | 0 |
| 1 | 00...00 | 1 | 2 | ... | 3 |
| 2 | 10...00 | None | 4 | ... | 4 |
| ... | ... | ... | ... | ... | ... |
| m−1 | 11...11 | None | None | ... | None |

N volumes — 214

M pieces

COW Bitmap rows: V1 (lower), Vn (upper)

FIG.9

| Snapshot Name | Snapshot Acquisition Time | Annihilation Prohibition Bit |
|---|---|---|
| V1 | 2009/09/01 | 1 |
| V2 | 2009/09/02 | – |
| ⋮ | ⋮ | – |
| Vn | 2009/09/30 | – |

| | System ID | Volume ID | Snapshot Name |
|---|---|---|---|
| Local Information (1) | 401a | 402(1)a | 403(1)a |
| Local Information (2) | | | |
| Local Information (3) | | | |
| Remote Information (1) | 404 | 405(1) | — |
| Remote Information (2) | | | — |
| Remote Information (3) | | | — |

(2)

| | System ID | Volume ID | Snapshot Name |
|---|---|---|---|
| Local Information (1) | 401a | 402(1)a | 403(1)a |
| Local Information (2) | 401a | 402(2)a | 403(2)a |
| Local Information (3) | | | |
| Remote Information (1) | 404 | 405(1) | — |
| Remote Information (2) | 404 | 405(2) | — |
| Remote Information (3) | | | — |

(3)

| | System ID | Volume ID | Snapshot Name |
|---|---|---|---|
| Local Information (1) | 401a | 402(1)a | 403(1)a |
| Local Information (2) | 401a | 402(2)a | 403(2)a |
| Local Information (3) | 401(3)a | 402(3)a | 403(3)a |
| Remote Information (1) | 404 | 405(1) | — |
| Remote Information (2) | 404 | 405(2) | — |
| Remote Information (3) | 404 | 405(3) | — |

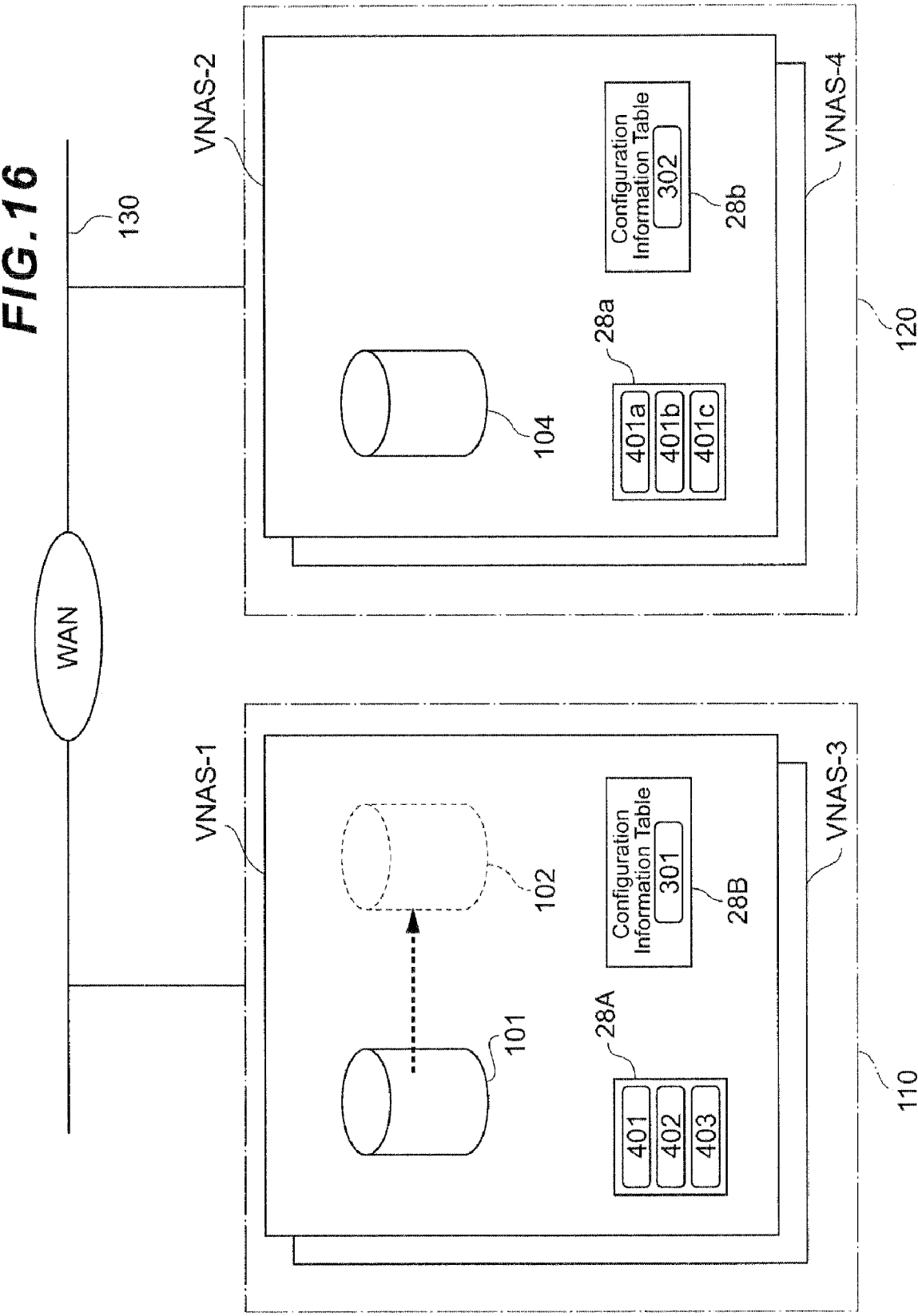

SYSTEM AND METHOD FOR ESTABLISHING A COPY PAIR RELATIONSHIP BETWEEN SOURCE AND DESTINATION VOLUMES

TECHNICAL FIELD

The present invention relates to a replication system. In particular, the invention relates to a remote replication system for performing remote replication between a storage apparatus at a local site and a storage apparatus at a remote site.

BACKGROUND ART

It is known that a conventional storage system has a system called "RUS (Replication Utility for SyncImage [trademark])" having a function that copies file data to a remote place. This system is called a "remote replication" system or "remote copy" system. This is a system for performing remote copying from a NAS unit at a local site via an IP network to a NAS unit at a remote site.

The unit at the local site creates a virtual file system as a snapshot and stores differential information as a result of data update, thereby enabling users to obtain backups of a plurality of generations.

Creation of snapshots at a NAS unit is disclosed in Japanese Patent Laid-Open (Kokai) Application Publication No. 2004-342050. The NAS unit provides users with data images staticized at the time of acquisition of a snapshot of a primary volume as an operation volume which is continuously accessed by a client computer, based on the primary volume and a differential volume storing data before update when the primary volume has been updated.

As the local site copies differential data between snapshot generations to the remote site, the remote site can always provide users with remote backups of operation volume file data at the local site at a certain point in time.

If the storage system is to start the operation to perform remote copying between the local site and the remote site, an administrator or an operator of the storage system needs to execute a pair definition between a primary volume at the local site and a replication volume at the remote site on the units at both sites and copy the entire data of the primary volume to the replication volume. This is called "initial copying."

Other conventional arts related to the present invention include Japanese Patent Laid-Open (Kokai) Application Publications Nos. 2007-241848, 2008-129723, 2007-317186, and H11-102262.

CITATION LIST

Patent Literature

[PTL 1]
Japanese Patent Laid-Open (Kokai) Application Publication No. 2004-342050
[PTL 2]
Japanese Patent Laid-Open (Kokai) Application Publication No. 2007-241848
[PTL 3]
Japanese Patent Laid-Open (Kokai) Application Publication No. 2008-129723
[PTL 4]
Japanese Patent Laid-Open (Kokai) Application Publication No. 2007-317186
[PTL 4]
Japanese Patent Laid-Open (Kokai) Application Publication No. 2007-317186
[PTL 5]
Japanese Patent Laid-Open (Kokai) Application Publication No. H11-102262

SUMMARY OF INVENTION

Technical Problem

When a storage apparatus at the local site is to perform initial copying to a storage apparatus at the remote site via a network, since the data size required for the initial copying is enormously huge, the initial copying will occupy the network for a long time. Therefore, it is possible to think of executing the initial copying via portable storage media such as magnetic tapes.

When the initial copying is to be executed via magnetic tape media, the administrator or the operator of the remote site has to set a volume at the remote site to constitute a pair with the primary volume.

If the operator associates an already operated area at the remote site with the primary volume during the above-described process, the data being operated will be overwritten. Also, there is a possibility that a volume whose access right is widely made public at the remote site might be defined as a copy pair volume. Furthermore, since there are a large number of parameters necessary for the operator at the remote site to construct a pair, the pair formation operation may become complicated and there is a possibility that an unauthentic pair might be set the remote site.

On the other hand, there is a problem of insufficient security in terms of handling of tapes, for example, handling of labels. A label indicating volume information is usually attached to a tape. If the label should be separated from the tape, that would influence confidentiality of the information about the primary volume and there is also a possibility that the operator might not be able to reliability set an authentic pair with the primary volume at the remote site.

Therefore, it is an object of the present invention to provide a backup system and its control method capable of automatically forming an authentic copy pair with the primary volume at a copy destination system without depending on an operator and realizing the pair formation without labeling a tape.

Solution to Problem

In order to achieve this object, a system for performing initial copying of data of a copy source volume from a portable storage medium storing the data of the copy source volume to a copy destination volume according to the present invention is characterized in that the portable storage medium stores management information about the copy source volume; wherein a system to which the copy destination volume belongs copies data of the portable storage medium to copy destination volume information, reads the management information from the copy destination volume, and sends it to a system to which the copy source volume belong; and this system judges whether these pieces of information are authentic or not; and if an affirmative judgment is returned, it is determined that the copy source volume and the copy destination volume constitute an authentic copy pair.

Advantageous Effects of Invention

According to this invention, it is possible to provide a backup system and its control method capable of automatically forming an authentic copy pair with the primary volume at a copy destination system without depending on an operator and realizing the pair formation without labeling a tape.

BRIEF DESCRIPTION OF DRAWINGS

FIG. 2 is a snapshot management table as management information.

FIG. 9 is a block diagram of a snapshot management table.

FIG. 15 is a diagram explaining an RUS configuration information table at the remote site and a transition of its stored data according to the embodiment in FIG. 13.

FIG. 16 is a block diagram of a backup system according to an embodiment that enables data copying between virtualized NASOSs.

DESCRIPTION OF EMBODIMENTS

Figure 1:
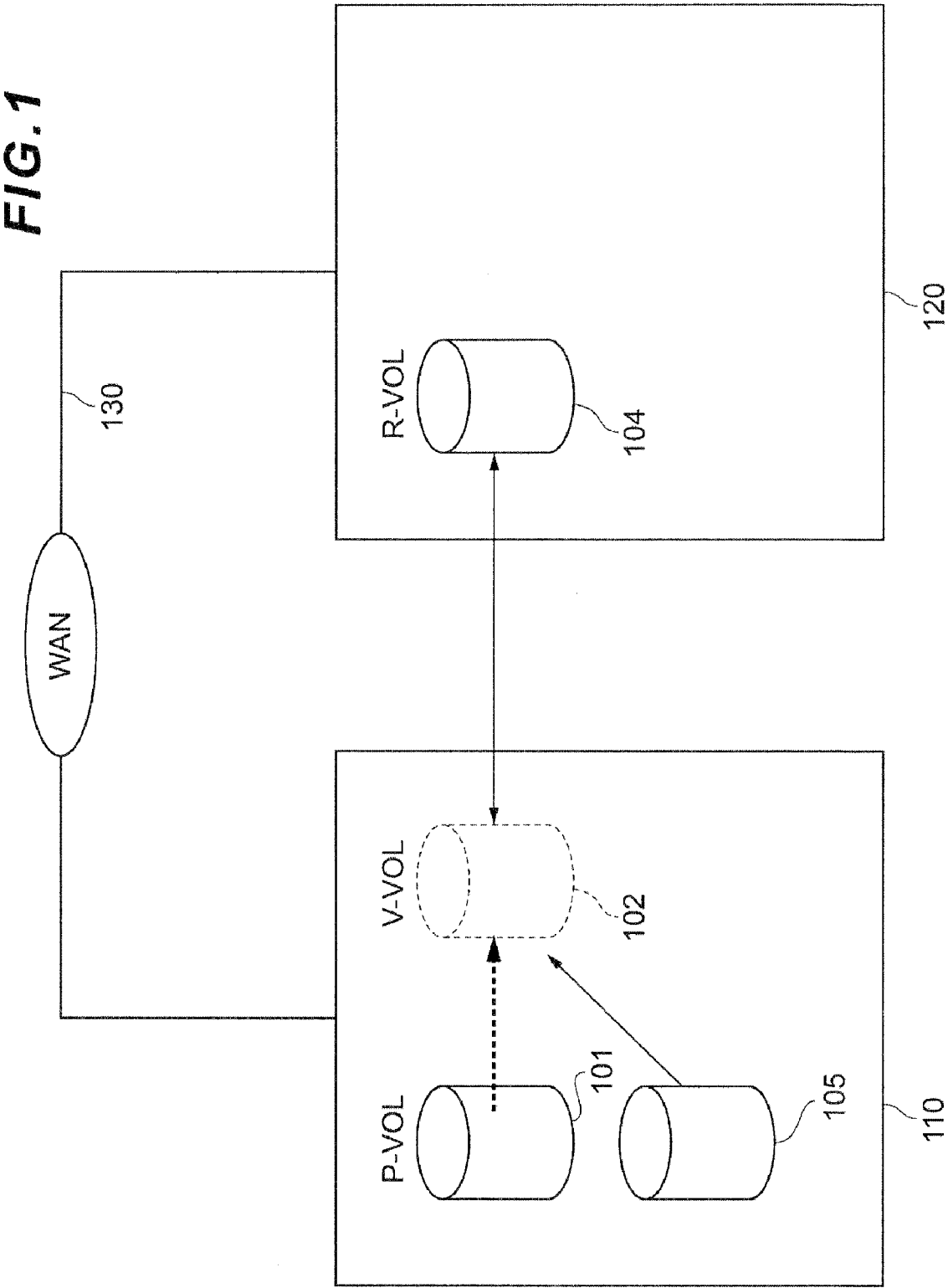
FIG. 1 is a hardware block diagram showing the outline of a remote copy system.

Next, embodiments of the present invention will be explained with reference to the attached drawings. FIG. 1 is a hardware block diagram showing the outline of a remote copy system. The remote copy system includes a local site 110, a remote site 120, and a wide area network (WAN) 130 for connecting these sites.

The local site 110 provides a host computer with a logical volume 101 as a data write/read target. This logical volume 101 is an operation volume storing operation data of the host computer and is a primary volume (P-VOL) that forms a copy pair with a replication volume (R-VOL) 104 at the remote site 120.

The remote site 120 has the replication volume 104 as described above. The primary volume 101 and the replication volume 104 have a copy pair relationship, and the replication volume 104 stores online backup data of the primary volume 101 (which may sometimes be called "replication data," and the backup data and replication data will be hereinafter collectively referred to as "backup data"). The local site 110 obtains a snapshot of the primary volume in order to back up the data of the primary volume 101.

A snapshot is a staticized data image of the primary volume 101 at a certain point in time. The local site 110 and the remote site 120 copy snapshot data to the replication volume 104. The local site 110 periodically obtains snapshots, so that backups of the primary volume are periodically stored in the replication volume.

A snapshot is constituted from a virtual volume 102 and the substantial data of this virtual volume is made of the primary volume 101, a differential volume 105, and snapshot management information.

After a snapshot is created, pre-update data of the primary volume 101 is stored in the differential volume 105 and the update position of the primary volume is managed by the management information.

FIG. 2 is a snapshot management table as the management information as explained in Japanese Patent Laid-Open (Kokai) Application Publication No. 2004-342050 mentioned earlier. Each of V1 to Vn is a virtual volume constituting a snapshot at a certain point in time, for example, at 23:00 every day and the number in each row of the virtual volume is a block address of the differential volume 105 storing data before the update.

A COW bitmap is information indicating whether the block address of the primary volume for each snapshot has been updated or not. If "0" is set to the COW bitmap field, it means that the relevant block address has been updated. A sequence of numbers in each row of the COW bitmap corresponds to each block address of the virtual volume. Data of a block to which "0" is set is read from the differential volume 105, while data of a block to which "1" is set is read from the primary volume 101.

Figure 3:
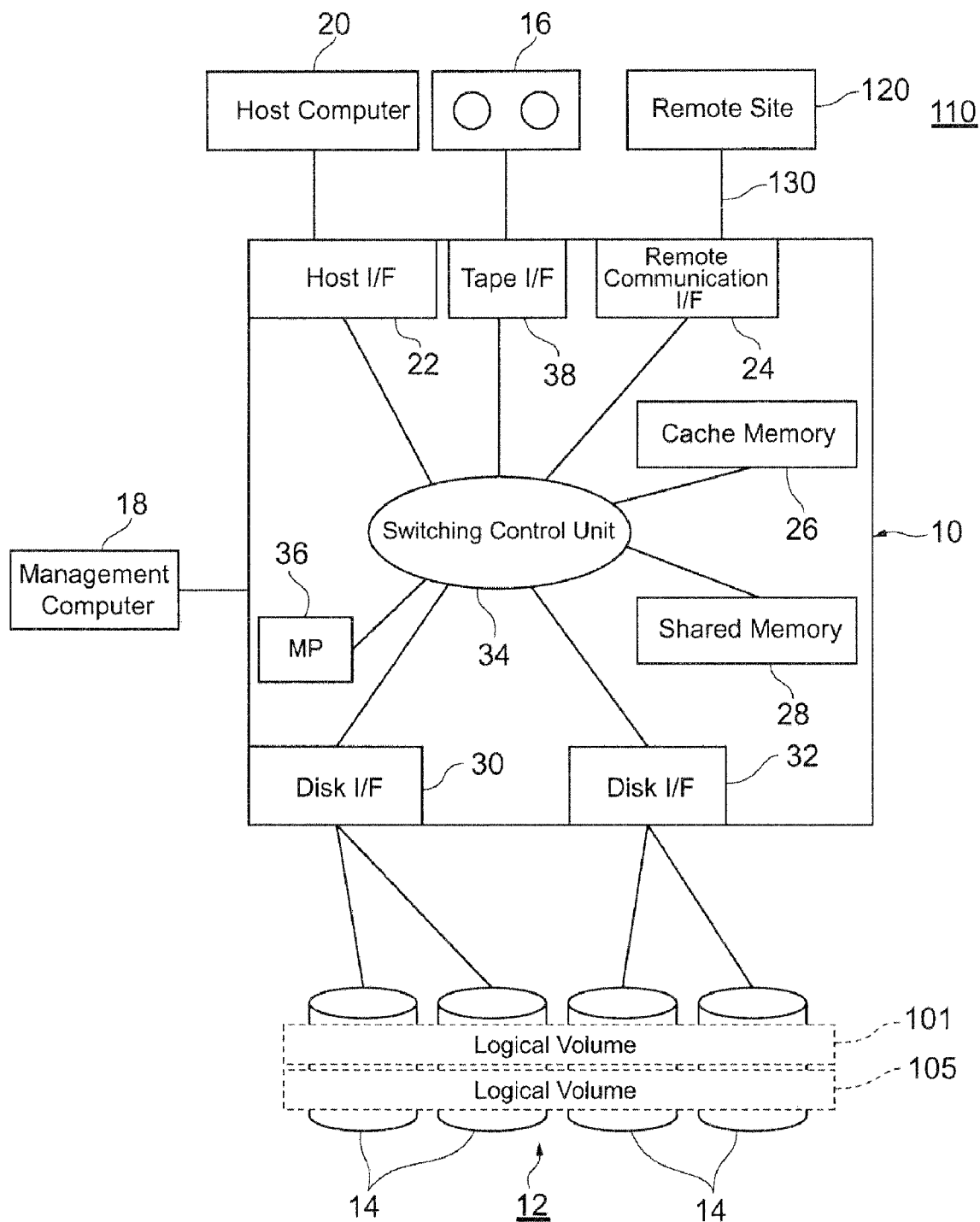
FIG. 3 is a hardware block diagram at a local site (copy source storage site).

FIG. 3 is a hardware block diagram of the local site (copy source storage site) 110. The local site 110 includes: a NAS unit 10 for providing a plurality of hosts 20 with file sharing service; a storage apparatus 12 in which a plurality of hard disks 14 are set in an array based on RAID (Redundant Array of Independent [or Inexpensive] Disks); a tape drive 16; and a management computer 18. The remote site (copy destination storage site) 120 is configured in almost the same manner as the local site.

The NAS unit 10 includes a host interface (I/F) 22 that is a connector to the host computer; a remote communication I/F 24 that is a connector to the remote site; disk I/Fs 30, 32 that are connectors to the hard disk drives; a tape I/F 38 that is a connector to the tape drive 16; a cache memory 26; a shared memory 28; a microprocessor (MP) 36; and a switching control unit 34. The management computer 18 manages the NAS unit 10.

The cache memory 26 is a volatile or nonvolatile memory and temporarily stores data received from the host 20 and data read from the tape drive 16 or the hard disk drive 14.

The shared memory 28 is, for example, a volatile or nonvolatile memory and stores information about control of the NAS unit 10. Both the shared memory 28 and the cache memory 24 may exist as different areas of one memory.

The switching control unit 34 is a device for connecting each I/F, the cache memory 24, the shared memory 28, and the MP 36 to each other and includes, for example, a high-speed bus such as a very high speed crossbar switch for transmitting data by means of a high-speed switching action.

The storage apparatus 12 includes a plurality of hard disk drives 14 arranged in an array. Flexible disks or optical disks may be used instead of the hard disks; and furthermore, magnetic tapes or semiconductor memories such as flash memories may also be used.

The NAS unit 10 creates a RAID group based on the plurality of hard disk drives 14, divides it into a plurality of areas, and provides the host with the divided areas as logical volumes. Regarding the types of logical volumes, there are the primary volume 101 and the differential volume 105 at the local site; and there is the replication volume 104 at the remote site.

The NAS unit at the remote site is connected to the remote communication I/F 24 via the wide area network 130.

Incidentally, magnetic tapes which are set to the tape drive 16 are an example of portable storage media, and large capacity hard disks may be used instead of the magnetic tapes. The entire data of a baseline snapshot (virtual volume 102) at the local site 110 is backed up to the tapes for the purpose of initial copying for remote copying.

The microprocessor 36 executes various programs stored in the shared memory 28 and provides the user with a file sharing service, a snapshot function, and a backup function.

Figure 4:
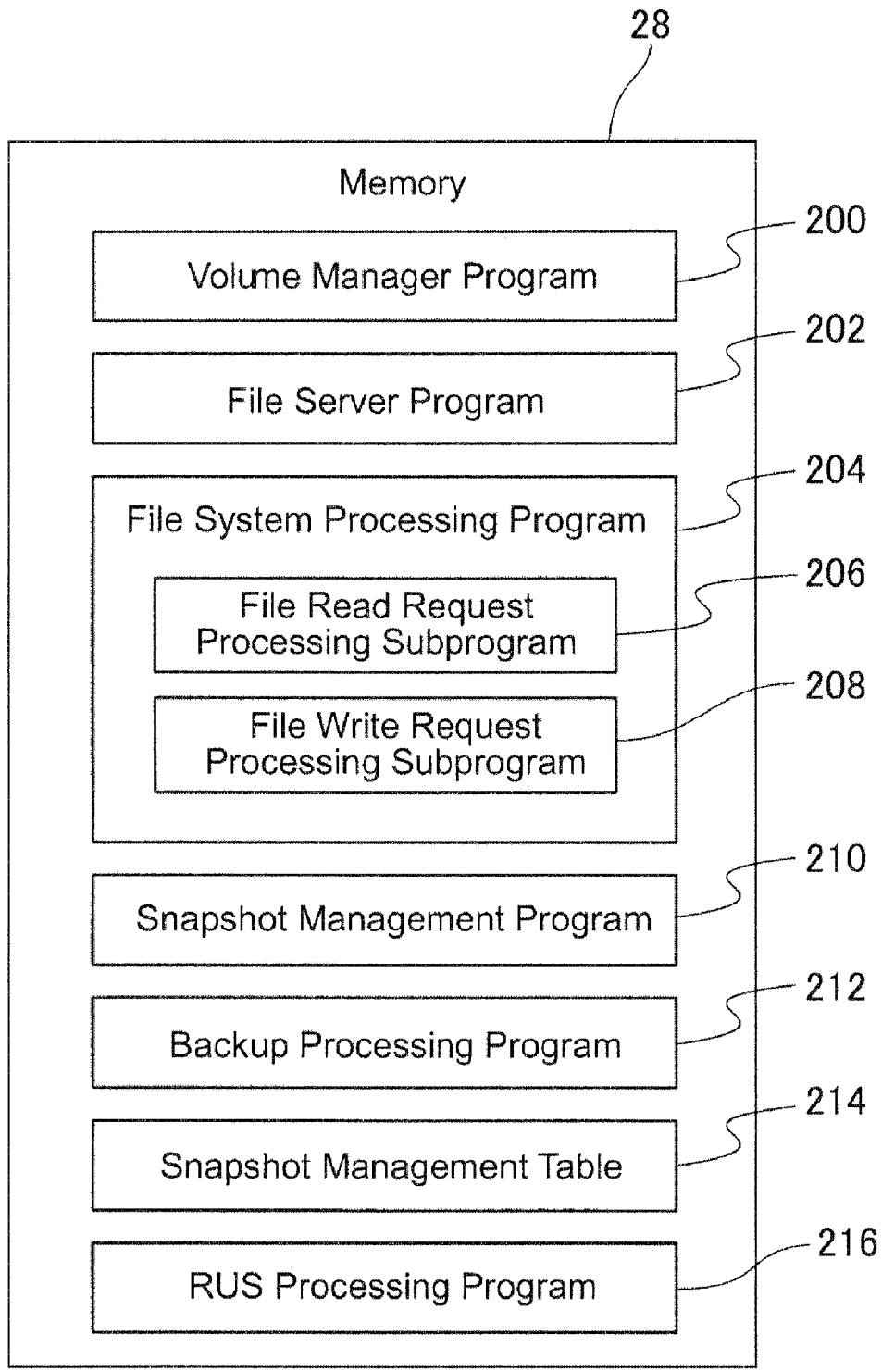
FIG. 4 is a block diagram of a shared memory.

FIG. 4 is a block diagram of the shared memory 28. A plurality of programs operating under the control of an NASOS exist in the shared memory 28. Incidentally, a program is indicated as a subject in the explanation below of various control processing, but an arithmetic unit (MP) for executing programs actually executes each control processing.

The NASOS includes: a volume manager program 200 for generating a virtual volume and showing it as a snapshot volume to the user; a file server program 202; a file system processing program 204; a snapshot management program 210; a backup processing program 212; a snapshot management table 214 (FIG. 2); and an RUS processing program 216.

Having received a snapshot creation request from the host computer 20, the volume manager program 200 staticizes a data image of the primary volume 101 at that point in time and provides it to the host computer.

When the local site 110 starts remote copy operation, the volume manager program 200 generates a snapshot 102 of the primary volume 101; and the backup processing program 212 backs up the staticized data of the primary volume from the snapshot (virtual volume 102) via the tape I/F 38 to the tape drive 16.

After the remote site 120 copies the data on the tape to the replication volume 104, the local site 110 transfers update differential data relative to the primary volume 101 via the network 130 to the replication volume 104 at the remote site.

After starting the remote copy operation, the volume manager program 200 periodically creates a snapshot of the primary volume 101. The differential data is obtained by comparing the management information of the two snapshots.

In response to a data access request from the host computer 20, the file server program 202 requests that the file system processing program 204 should execute file/directory read processing or write processing; and the file server program 202 then returns the execution result to the host computer 20 which made the request.

Furthermore, when there is a plurality of users, the file server program 202 manages file sharing by performing user authentication and granting an access right to the uses.

The file system processing program 204 includes at least a file read request processing subprogram 206 and a file write request processing subprogram 208.

In response to a file or directory read request or write request issued by the file server program 202 or the snapshot management program 210, the file system processing program 204 designates a volume storing the relevant file or directory, and the position and size of a block to be accessed and issues data read processing or write processing to the snapshot management program 210.

Since the file system processing program 204 can utilize information at the time of creation of a snapshot by accessing the snapshot volume 102, it can provide the host computer 20 with a snapshot image of the file system.

Figure 5:
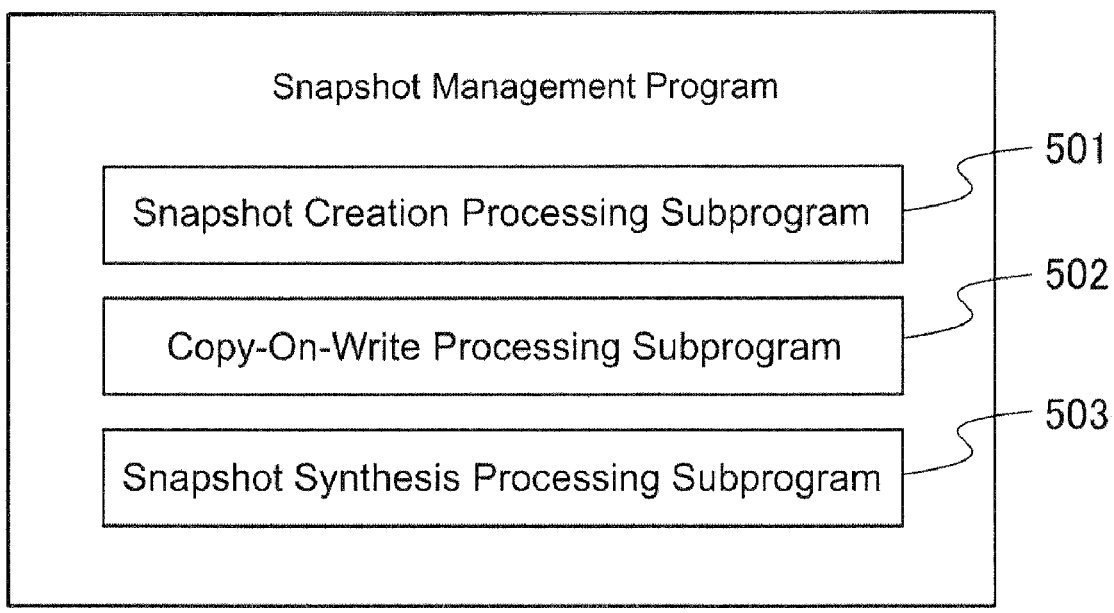
FIG. 5 is a block diagram showing the details of a snapshot management program.

The snapshot management program 210 includes at least a snapshot creation processing subprogram 501, a Copy-On-Write processing subprogram 502, and a snapshot synthesis processing subprogram 503 as shown in FIG. 5.

The snapshot creation processing subprogram 501 generates a snapshot of the primary volume 101. The snapshot creation processing subprogram 501 further generates the virtual volume 102 so that the host computer 20 and the backup processing program 212 can access the snapshot.

In response to a snapshot acquisition request from the host computer 20 or the management computer 18, the snapshot creation processing subprogram 501 sets an area for a virtual volume of the snapshot in the snapshot management table 214 (FIG. 2).

The virtual volume itself, which constitutes a snapshot, is virtual and has no storage area allocated thereto, while the primary volume 101 and the differential volume 105 are substantial and store data relating to snapshots.

The Copy-On-Write processing subprogram 502 manages the differential volume 105, which stores pre-update differential data necessary to maintain snapshots, by using the snapshot management table 214 and executes processing for maintaining the snapshots even when data write processing is executed on the primary volume 101 in response to a request from the file system processing program 204.

Specifically speaking, when writing data to the primary volume 101, the Copy-On-Write processing subprogram 502 copies the pre-update data stored in the primary volume to the differential volume 105 and then updates the stored content of the primary volume 101.

Also, the Copy-On-Write processing subprogram 502 manages data stored in the primary volume 101 and the differential volume 105 so that the user can access the data stored in the primary volume 101 after the generation of a snapshot; and the Copy-On-Write processing subprogram 502 enables the host computer 20 to access the virtual volume 102 for providing the generated snapshot of the primary volume.

Furthermore, the Copy-On-Write processing subprogram 502 forms a bitmap to judge whether data to be read exists in the primary volume 101 or in the differential volume 105; and then stores the bitmap in the snapshot management table 214.

In response to a request from the file system processing program 204 or the backup processing program 212, the snapshot synthesis processing subprogram 503 executes processing for reading the virtual volume 102.

Specifically speaking, the snapshot synthesis processing subprogram 503 refers to a bitmap area in the snapshot management table 214, decides from where it should read data, either the primary volume 101 or the differential volume 105, and supplies data from the address of the decided volume to the file system processing program 204.

After receiving a backup request, which designates a specified snapshot, from the management computer 18, the backup processing program 212 reads data from the snapshot 102, transfers it to the tape I/F 38, and forms a backup of the snapshot at a specified date and time on a magnetic tape in the tape drive 16.

The RUS processing program 216 executes processing for remote copying from the local site 110 to the remote site 120.

Next, the initial copying operation of the remote copy system will be explained below with reference to FIGS. 6 and 7. The initial copying is performed as described above by copying the entire data of the primary volume 101 at a certain point in time to the replication volume 104 which is a backup volume of the primary volume 101 when the remote copying operation is started. The local site 110 generates a snapshot at a certain point in time in order to staticize the entire data of the primary volume at this certain point in time. This snapshot becomes the basis of the initial copying and is called a "baseline snapshot" in order to be distinguished from other snapshots.

Figure 6:
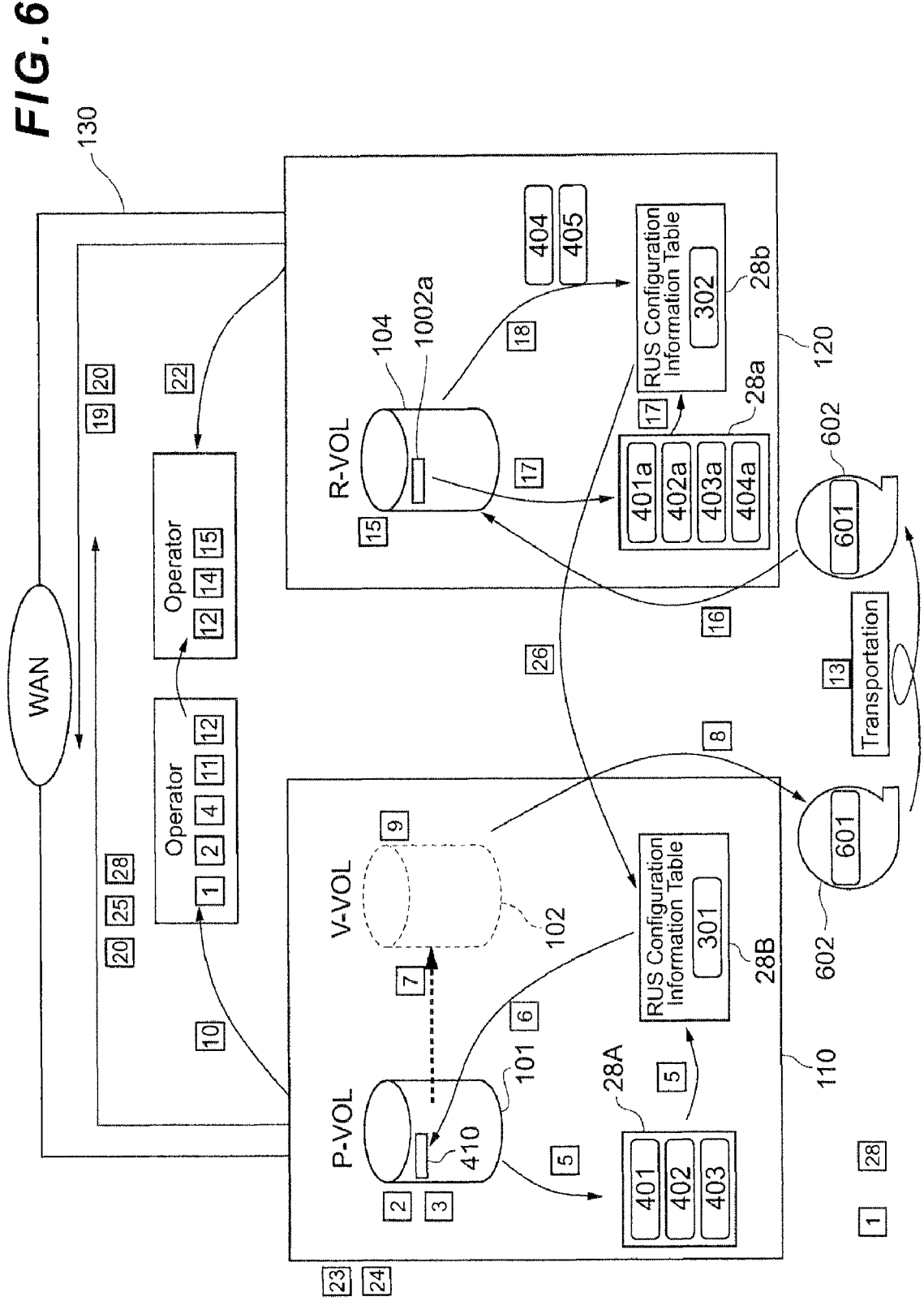
FIG. 6 is a hardware block diagram for explaining the operation of initial copying at a remote copy system.
Figure 7:
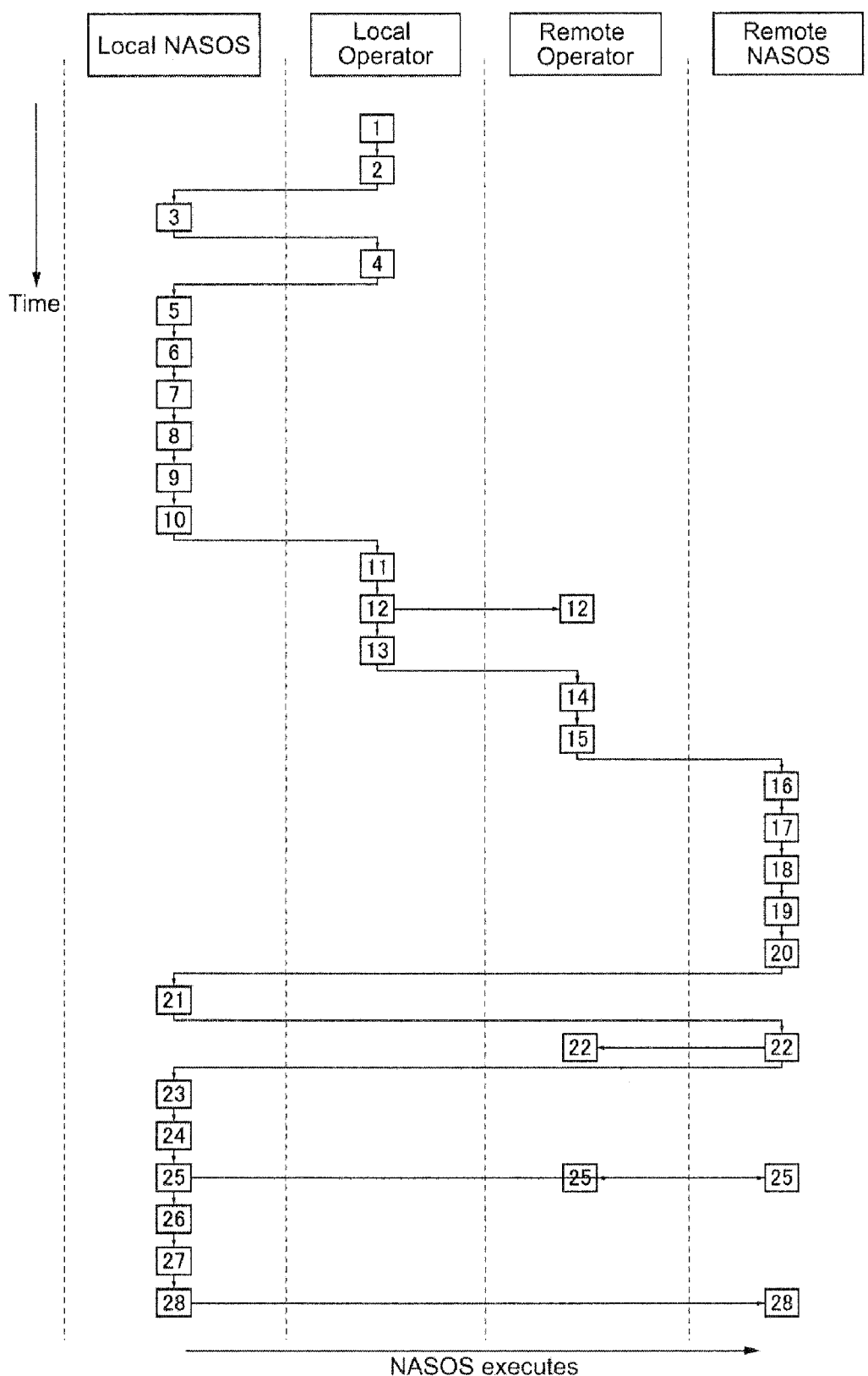
FIG. 7 is a timing chart for explaining the above-mentioned operation.

FIG. 6 is a hardware block diagram for explaining the initial copying operation at the local site 110 and the remote site 120. FIG. 7 is a timing chart for explaining a processing sequence for the initial copying between an NASOS at the local site, an operator at the local site, an operator at the remote site, and an NASOS at the remote site. Incidentally, numbers indicated after the hash mark # as in "#**" correspond to the numbers in a square as shown in FIGS. 6 and 7.

The operator at the local site (local operator) gives an instruction to the NASOS at the local site (local NASOS), that is, the backup processing program 212 to automatically start the initial copying, using a GUI for the management computer 18 (#1).

The management computer 18 issues an inquiry command to the NAS unit 10. The MP 36 refers to the volume management table in the shared memory 28 and sends the ID(s) of the primary volume(s) 101 in operation to the management computer 18. The number of the primary volume(s) in operation is not limited to one, and a plurality of primary volumes in operation may exist.

The GUI for the management computer 18 displays a list of IDs of the primary volumes 101 on a screen. The local operator selects the primary volume which should be the target of initial copying (#2).

After the primary volume 101 is selected, the backup processing volume 212 for the local NASOS refers to the information table in the shared memory 28, reads the local site system ID, for example, the production number of the storage system, and further decides the name of the baseline snapshot (#3). Incidentally, if a unique name can be decided, the operator may set the snapshot name.

"Vn" in the snapshot management table 214 is an example of the snapshot name. The snapshot name may be a date and time of acquisition of the relevant snapshot. Alternative characteristic information instead of the snapshot name may be the snapshot ID. Incidentally, unless otherwise stated, the various actions shown in FIGS. 6 and 7 are executed by the backup processing program 212 for the local NASOS.

After the local NASOS sends a reception notice of the primary volume ID to the management computer 18, the management computer requests that the local operator should input a password necessary to define a remote copy pair (#4).

The local NASOS describes the local site system ID 401 as a specific information area for the initial copying, the primary volume ID 402, and the baseline snapshot name 403 in an initial copy management information table 28A in a specified area of the shared memory (#5).

The local NASOS reads these pieces of initial copy management information from the initial copy management information table 28A and registers them in an RUS configuration information table 301 in an RUS configuration information storage area 28B of the shared memory 28.

Figure 8:
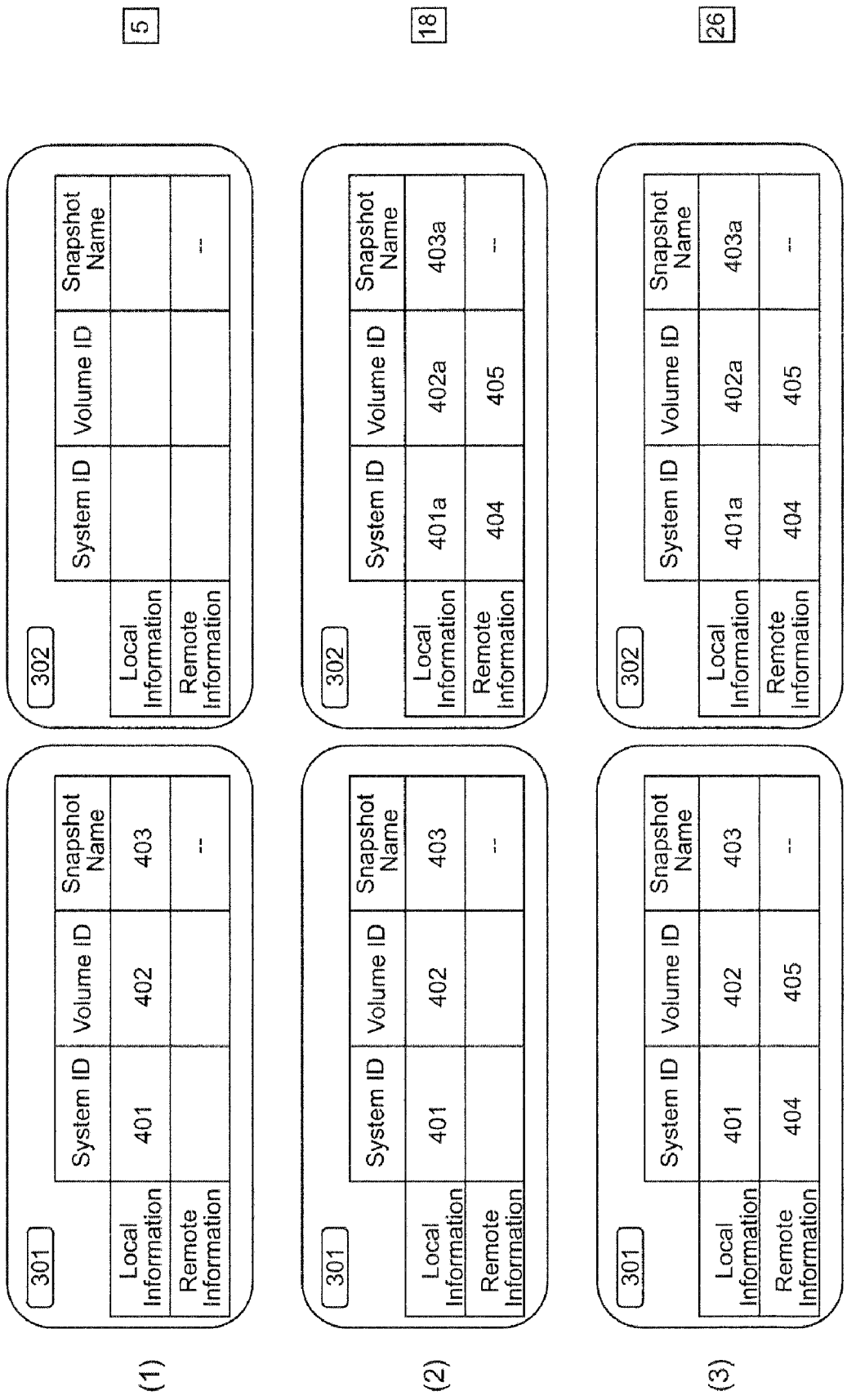
FIG. 8 is a block diagram showing the configuration of an RUS configuration table and a transition of data to be stored.

FIG. 8 shows the details of the RUS configuration information table 301. The RUS configuration information table includes an area for registering local information and an area for registering remote information. In each of these areas, there are an area for registering the system ID of a storage apparatus, an area for registering a real volume ID, and an area for registering a snapshot name, that is, a virtual volume name. Similarly, an initial copy management information table 28a and an RUS configuration information table 28b exist in the shared memory 28 for the remote site 120. Instead of or together with the snapshot name, snapshot acquisition time can be the management information.

FIG. 8(1) shows the RUS configuration information table 301 in which the local site system ID 401, primary volume ID 402, and baseline snapshot name 403, which are read from the initial copy management information table 28A in step #5, are registered.

Next, the local NASOS reads the local site system ID 401, primary volume ID 402, and baseline snapshot name 403 from the RUS configuration information table 301 (FIG. 8(1)) and writes them to, for example, an i-node reserve area 410 which is a management area of the primary volume (#6).

The local NAS stores the initial copy management information in a specified unused i-node area in accordance with a protocol. The remote NASOS also has this protocol and recognizes in which area the local NASOS stores the initial copy management information. In other words, no device other than the local NASOS or the remote NASOS recognizes in which area the initial copy management information is stored.

For example, assuming that there are 100 i-node areas, the local NASOS sequentially stores i-nodes in specified i-node areas when writing data to the file system of the primary volume 101. The local NASOS manages the i-node areas capable of recording the i-nodes by registering them in a free area list.

An arrangement about the i-node areas to which the initial copy management information is to be written is set to the local NASOS in advance. For example, assuming that the initial copy management information is recorded in the i-node area with a certain number, any i-node is prevented from being stored in this i-node area except when the initial copying is performed.

Next, the snapshot creation processing subprogram 501 for the local NASOS creates the baseline snapshot, using the name decided in step #3 and registers the virtual volume 102 constituting the snapshot in the snapshot management table 214 (FIG. 2) (#7). Incidentally, the existing snapshot volume may be selected as the base line snapshot when starting the operation of the RUS.

Subsequently, the backup management program 212 sequentially reads all the blocks of the virtual volume 102 by referring to the snapshot management table 214 and writes the entire data of the primary volume 101 from the primary volume 101 or the differential volume 105 to a data block area in a volume 601 of the magnetic tape 602 (#8).

The backup management program 212 sets an annihilation prohibition bit "1" to the virtual volume corresponding to the baseline snapshot in a snapshot maintenance management table (FIG. 9) (#9).

The snapshot processing program 210 deletes a snapshot entry, regarding which a certain amount of time has elapsed since the snapshot acquisition time, from the snapshot management table 214 according to the policy, thereby releasing the area of the differential volume 105 with a limited capacity. On the other hand, the management information for the baseline snapshot needs to be maintained until the completion of the initial copying.

Therefore, the backup processing program 212 refers to the snapshot maintenance management table and avoids executing deletion of the management information for the snapshot to which the annihilation prohibition bit "1" is set, so that the baseline snapshot will be maintained until the initial copying is completed. Incidentally, the snapshot maintenance management table in FIG. 9 is stored in a specified area in the shared memory 28. Also, the snapshot management table has an area for the snapshot acquisition time and an area for the annihilation prohibition bit for each snapshot name (virtual volume name).

Next, the local NASOS notifies the local operator of the completion of data storage on the tape 602 via the management computer 18 and further notifies the RUS processing program 216 for the memory 28 that the RUS will be started normally (#10).

The RUS processing program 216 waits for normal termination of the initial copying and normal start of the remote copying. The local operator stores the capacity of the primary volume by referring to the management information for the local site (#11). The local operator transmits the capacity information and a password for the primary volume to the remote operator (#12). The local operator sends the tape to the remote operator (#13).

Figure 10:
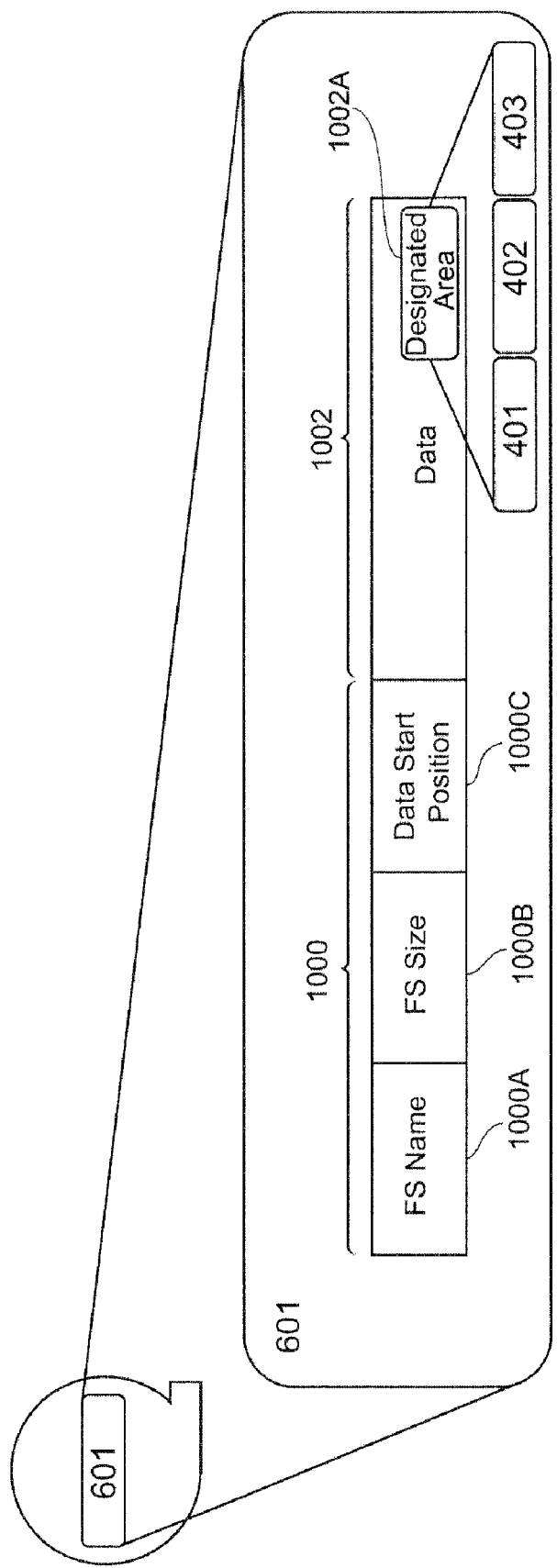
FIG. 10 is a block diagram showing the detail of a file system of a tape volume.

FIG. 10 is a block diagram showing the details of the file system of the tape volume 601. The file system is constituted from a super block 1000 and a data block 1002; and the super block 1000 is constituted from a file system name (FS name) 1000A, a file system size (FS size) 1000B, and a data start position 1000C.

The size of the data block is, for example, 2 TB (terabytes), and a plurality of i-node areas for the primary volume are copied to an i-node reserve area (designated area) 1002A in the data block. Therefore, the aforementioned initial copy management information 401,402, 403 are stored in the specified area in the tape volume.

The remote operator sets the replication volume 104 with the same capacity or larger capacity than that of the primary volume 101 at the local site 110 via the management computer 18 (#14).

Furthermore, the remote operator sets the tape received from the local site 110 to the tape drive 16 at the remote site 120, designates the replication volume ID, onto which data should be loaded, and the ID of the tape volume 601 to the backup processing program 212 via the management computer 18, and further gives an instruction to the RUS processing program 216 to automatically start remote copying (#15). Incidentally, if a plurality of volumes are contained in the tape, the IDs are designated a plurality of times.

The backup processing program 212 for the remote site sequentially reads data from the data block in the tape 602 and loads it onto the replication volume 104 (#16).

Since the same file system as that of the local site is mounted in the NASOS for the remote site, the backup processing program 212 can fetch the local site system ID (401a), primary volume ID (402a), snapshot name (403a), which are the initial copy management information for the local site, from the designated area 1002A in the loaded data and then writes these pieces of information to the initial copy management information table 28a (#17). Incidentally, the letter "a" is attached to the end of the number given to each piece of the initial copy management information in order to distinguish the original information at the local site from the read information at the remote site.

Furthermore, the backup processing program 212 reads the initial copy management information 401a, 402a, 403a from the initial copy management information table 28a and registers it in the RUS configuration information table 302 in the RUS configuration information storage area 28b.

Next, the backup processing program 212 refers to the management information in the shared memory 28 and registers the remote site system ID 404 and the replication volume ID 405 in the RUS configuration information table 302 (#18).

FIG. 8(2) shows the state of the RUS configuration information table 302 at the point in time when step #18 has terminated. Incidentally, each of FIGS. 8(1) to 8(3) shows a comparison between the RUS configuration information table 301 for the local site and the RUS configuration information table 302 for the remote site.

After the backup processing program 212 for the remote site terminates step #18, the RUS processing program 216 for the shared memory 28 reads the local site system ID 401a from the RUS configuration information table 302 and accesses the local site NASOS via the WAN 130 (#19).

After the NASOS (RUS processing program 216) for the remote site 120 confirms that this access has been established, it further refers to the RUS configuration information table 302, sends the initial copy management information 401a, 402a, 403a as well as the remote site system ID 404 and the replication volume ID 405 to the NASOS (RUS processing program 216) for local site 110, and requests collation between the local site information and the remote site information (#20).

The NASOS (RUS processing program 216) for the local site 110 records the initial copy management information 401a, 402a, 403a and other information received from the remote site in the specified area in the cache memory 26.

After receiving this request, the RUS processing program 216 for the local site requests input of a password by the RUS processing program for the remote NASOS (#21). The management computer 18 for the remote site lays out a password input screen for the remote operator (#22).

After the remote operator inputs the password, the password is sent to the local site 110 and the local NASOS checks it against the password stored in the shared memory (#23). If these received password are not identical to each other, the local site 110 returns an error to the remote site 120.

On the other hand, if the RUS processing program 216 for the local NASOS determines that these passwords are identical, it then judges whether the primary volume ID (402a) and snapshot name (403a) which are temporarily stored in the cache memory 26 are identical to the primary volume ID (402) and snapshot name (403) in the RUS configuration information table 301 (#24).

If the RUS processing program 216 for the local site returns a negative judgment on at least one of them, it notifies the remote site via the WAN 130 that it is "impossible to create a copy pair" (#25).

On the other hand, if the RUS processing program returns an affirmative judgment on both of them, it authenticates the replication volume 104 for the remote site 120 as a volume to constitute an authentic pair with the primary volume and writes the remote site system ID 404 and the replication volume ID 405 to the RUS configuration information table 301 on the local side (#26). FIG. 8(3) shows the state of the RUS configuration information table 301 on the local side and the RUS configuration information table 302 on the remote side at this moment.

Next, the local RUS processing program 216 clearly specifies in the snapshot maintenance management table (FIG. 9) that the snapshot created for the initial copying is the baseline snapshot; and then deletes the annihilation prohibition bit (#27).

Subsequently, the local RUS processing program notifies the remote RUS processing program of termination of the processing necessary to start the remote copying operation (#28).

The local RUS processing program and the remote RUS processing program recognize a pair of the primary volume and the replication volume in their respective RUS configuration information tables as an authentic copy pair and start the remote copying operation.

According to this embodiment as described above, unique information about the local site is stored in the storage area in the tape storing data of the primary volume; the unique information is extracted when the remote site loads the tape data onto the replication volume; this extracted unique information is sent via the network to the local site; the local site confirms that the unique information is authentic; and then the primary volume and the replication volume are authenticated to be an authentic copy pair. Therefore, it is possible to automatically form an authentic copy pair with the primary volume in the copy destination system without depending on the operators and to realize the formation of this pair without labeling the tape.

Next, the second embodiment of the present invention will be explained. This embodiment is characterized by addition of processing, which is executed when the remote operator sets a replication volume at the remote site, for judging whether the replication volume is authentic or not, to the aforementioned embodiment.

Specifically speaking, in step #14 of the aforementioned embodiment, the remote operator checks if no file system exists or is mounted in the replication volume; and if a negative judgment is returned, the processing for securing the replication volume is executed again. If an affirmative judgment is returned, the replication volume is prohibited from setting an access right.

Next in step #15, the remote operator designates the replication volume as the destination, onto which the tape should be loaded, and gives an instruction to the remote NASOS to start remote copying.

The remote NASOS checks if no file system exists or is mounted in the replication volume and the access right setting is prohibited. If a negative judgment is returned, the remote NASOS outputs a message to the management computer, indicating that the replication volume is not authentic. The remote operator can execute the replication volume setting processing again.

Since whether the replication volume is authentic or not is checked according to this embodiment, security at the time of start of the remote copying operation is more assured.

Figure 11:
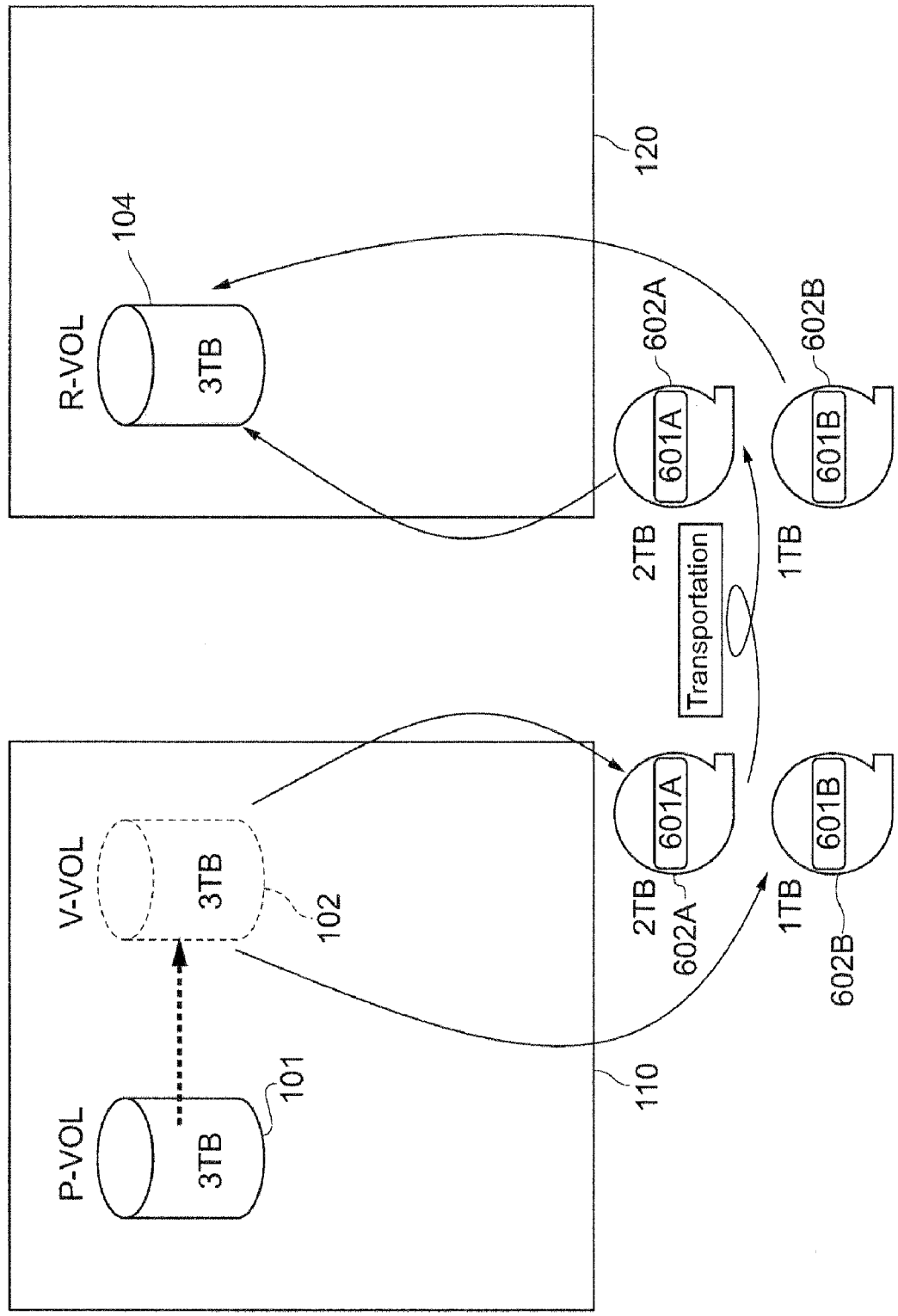
FIG. 11 is a block diagram of a backup system according to an embodiment in which data of a primary volume is divided into and stored in two magnetic tapes.

Next, the third embodiment will be explained. This embodiment is characterized by the capacity of the primary volume 101 larger than that of the data area in the tape 602. Specifically speaking, if the capacity of the primary volume 101 is 3 TB and the capacity of the data area in the tape 602 is 2 TB as shown in FIG. 11, data of the primary volume 101 is divided into and stored in two tapes 602A, 602B. Reference numeral "601A" represents a volume of the tape 602A and "601B" represents a volume of the tape 602B.

Figure 12:
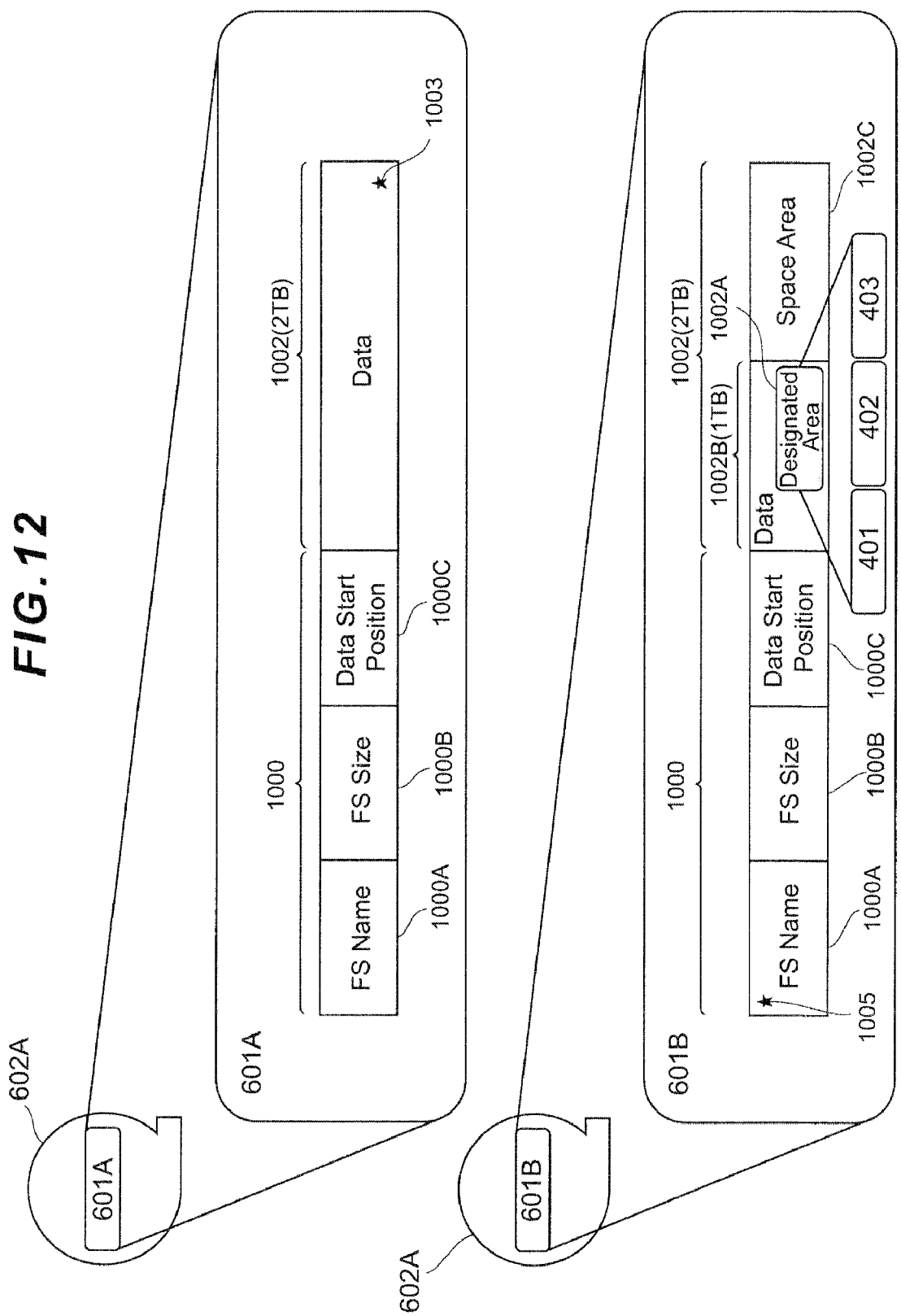
FIG. 12 is a block diagram of file systems of the two magnetic tapes according to this embodiment.

FIG. 12 shows block diagrams of two tapes. A flag 1003 indicating that data continues to the second tape 602B is registered in the last block of a data area 1002 in the first tape 602A. Furthermore, a flag 1005 indicating that data which continues from the first tape 602A is stored is set to a top block (file name area 1000A) in the second tape 602B.

Data of 2-TB size is stored in the full 2-TB capacity of the data area in the first tape 602A. Data is stored in a 1-TB area 1002B extending from the beginning of the data area 1002 in the second tape 602A. The remaining 1-TB area 1002C is a unused area. The designated area 1002A storing the management information (401 to 403) for the initial copying is contained in the data area 1002B for the second tape 602B. However, this may be contained in the first tape.

When the remote operator loads the magnetic tape media onto the remote system 120, the entire data is loaded onto the remote system 120 by setting the first tape 602A to the tape drive 16 and, after completion of loading of the data in the first tape 602A, setting the second tape 602B to the tape drive 16.

If the second tape 602B is set to the tape drive before setting the first tape 602A, the backup processing program 212 refers to the flag 1005 information at the top of the second tape and outputs a message stating that the first tape should be set first, to the management computer 18. Meanwhile, after loading the data of the first tape is finished, the backup processing program 212 refers to the end flag 1003 in the first tape and generates a message urging the second tape to be set.

Even if the capacity of a magnetic tape is smaller than the primary volume 101, the operator can load exactly the entire data of the primary volume onto the replication volume 104 according to this embodiment.

Figure 13:
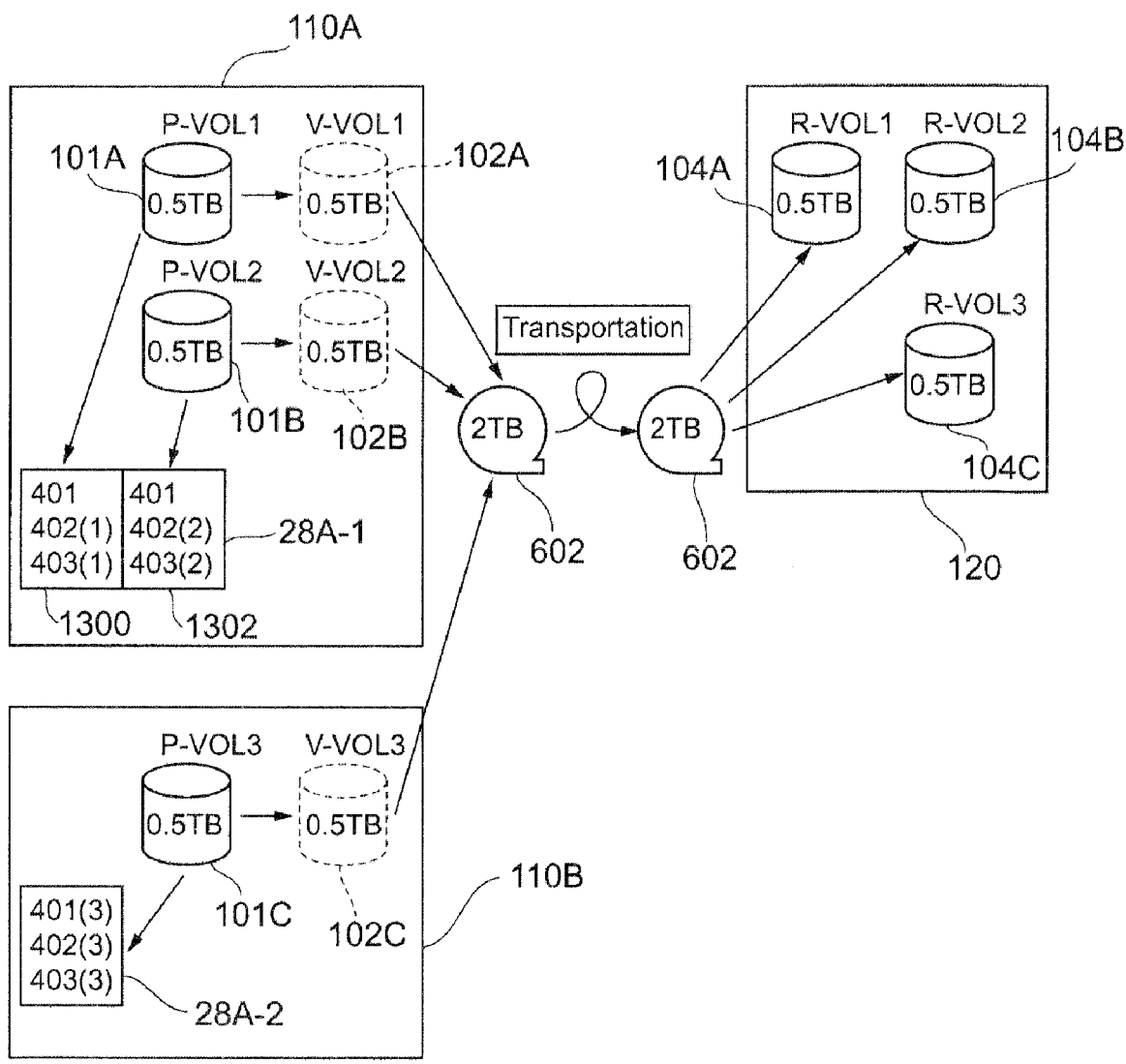
FIG. 13 is a block diagram of a backup system according to an embodiment in which data of a plurality of primary volumes is recorded on one magnetic tape.

Next, the fourth embodiment will be explained. This embodiment is characterized by recording data of a plurality of primary volumes on one magnetic tape. FIG. 13 is a block diagram showing an example of this embodiment. This block diagram shows a remote copy system constituted from two local sites 110A, 110B and one remote site 120. A primary volume 101A and a primary volume 101B exist at a first local site 110A and a primary volume 101C exists at a second local site 110B.

An area 1300 for the primary volume 101A and an area for the primary volume 101B exist in an internal memory 28A-1 for the first local site 110A. A local site system ID 401, an ID 402(1) of the first primary volume 101, and a snapshot name 403(1) of a first virtual volume 102A which is a snapshot of the first primary volume 101A are recorded in an area 1300.

The local site system ID 401, an ID 402(2) of the second primary volume 101B, and a snapshot name 403(2) of a second virtual volume 102B which is a snapshot of the second primary volume 101B are recorded in an area 1302.

A system ID 401(3) of the second local site 110B, an ID 402(3) of the third primary volume 101C, and a snapshot name 403(3) of a third virtual volume 102C which is a snapshot of the third primary volume 101C are recorded in an internal memory 28A-2 for the second local site 110B.

Since the capacity of the magnetic tape medium 602 is equal to or more than a total capacity of the first to third primary volumes 101A, 10B, 101C, it is possible to record the entire data of the first to third primary volumes in one magnetic tape medium.

Figure 14:
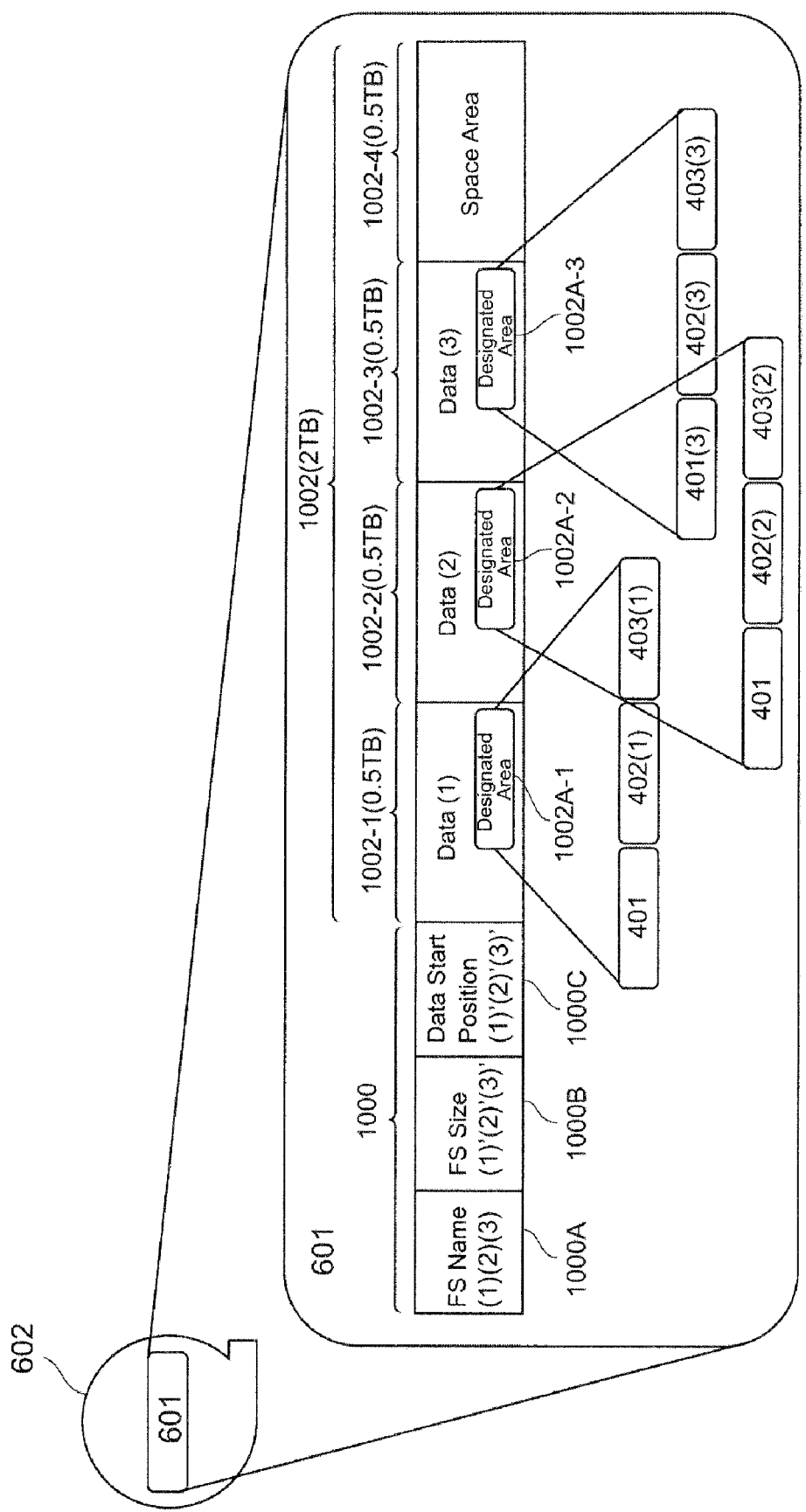
FIG. 14 is a block diagram of a file system of a magnetic tape according to the embodiment in FIG. 13.

FIG. 14 shows the block configuration of a tape, assuming that the data block capacity of the magnetic tape is 2 TB and the capacity of each of the first to third primary volumes is 0.5 TB.

Areas 1002-1, 1002-2, 1002-3 for recording the entire data of the first to third primary volumes are sequentially recorded in the data area 1002 of the tape from its top position. The capacity of each area is equal to that of each primary volume (0.5 TB). The last area 1002-4 (0.5 TB) in the data area of the tape is a space area.

A designated area exists in each primary volume area in the data area of the tape and the initial copy management information about each primary volume is recorded in this designated area. The management information is what is stored in the shared memories 28A-1, 28A-2 in FIG. 13.

Furthermore, information about the first to third primary volumes is recorded in the file system name 1000A, the file size 1000B, and the data start position 1000C, which are the management information for the super block 1000 of the tape. The number (1) represents the information about the first primary volume 101A, the number (2) represents the information about the second primary volume 101B, and the number (3) represents the information about the third primary volume 101C. The local operator sequentially copies the data of the first to third primary volumes on one tape.

As shown in FIG. 13, the remote operator sets the first to third replication volumes 104A, 104B, 104C at the remote site 120. The remote site NASOS sequentially loads, from one magnetic tape medium 602, data of the first primary volume 101A onto the first replication volume 104A, data of the second primary volume 101B onto the second replication volume 104B, and data of the third primary volume 101C onto the third replication volume 104C.

FIG. 15 shows a transition of the RUS configuration information table on the remote side during the process of loading those pieces of data. When the backup processing program 212 for the remote site 120 loads the data of the first primary volume 101A onto the first replication volume 104A, the first local site system ID 401a, first primary volume ID 402(1)a, and first snapshot name 403(1)a which are stored in the specified area in the first primary volume are recorded in a local information (1) entry and the remote site system ID 404 and first replication volume ID 405(1) are recorded in a remote information (1) entry as shown in table (1).

Furthermore, when the data of the second primary volume 101B is loaded onto the second replication volume 104B, the first local site system ID 401a, second primary volume ID 402(2)a, and second snapshot name 403(3)a which are stored in the specified area in the second primary volume are recorded in a local information (2) entry and the remote site system ID 404 and second replication volume ID 405(2) are recorded in a remote information (2) entry as shown in table (2).

Furthermore, when the data of the third primary volume 101C is loaded onto the third replication volume 104C, the second local site system ID 401(3)a, third primary volume ID 402(3)a, and third snapshot name 403(3)a which are stored in the specified area in the third primary volume 101C are recorded in a local information (3) entry and the remote site system ID 404 and third replication volume ID 405(3) are recorded in a remote information (3) entry as shown in table (3).

When the RUS processing program 216 for the remote site 120 accesses the first local site 110A based on the local information (1) and the remote information (1), and if the first local site determines that the information from the remote site is authentic information, it registers the system ID 404 for the remote site 120 and the first replication volume ID 405(1) in the configuration information table 301. As a result, the first local site 110A and the remote site 120 recognize that the first primary volume 101A and the first replication volume 104A constitute an authentic copy pair.

Next, when the RUS processing program 216 for the remote site 120 accesses the first local site 110A based on the local information (2) and the remote information (2), and if the first local site determines that the information from the remote site is authentic information, it registers the system ID 404 for the remote site 120 and the second replication volume ID 405(2) in the configuration information table 301. As a result, the first local site 110A and the remote site 120 recognize that the second primary volume 101B and the second replication volume 104B constitute an authentic copy pair.

Furthermore, when the RUS processing program 216 for the remote site 120 accesses the second local site 110B based on the local information (3) and the remote information (3), and if the second local site determines that the information from the remote site is authentic information, it registers the system ID 404 for the remote site 120 and the third replication volume ID 405(3) in the configuration information table 301. As a result, the second local site 110B and the remote site 120 recognize that the third primary volume 101C and the third replication volume 104C constitute an authentic copy pair.

Since data of a plurality of primary volumes can be stored in the same tape according to this embodiment as described above, even if there are a plurality of local sites, the remote operator can download the data from the plurality of primary volumes to the replication volume and form an authentic pair at the same time in the state where the remote operator can specify from where in one tape to where at the remote site.

Next, the fifth embodiment of the present invention will be explained. This embodiment is characterized by the capability to copy data between virtualized NASOS's. The aforementioned embodiments have described the initial copying from the primary volume(s) to the replication volume in the remote copy system from the local site to the remote site.

To the contrary, this embodiment is designed so that if a virtualization program is mounted in at least one of the NASOSs at the local site 110 and the remote site 120 and if one or more virtual NAS's are implemented, copying from a real NAS to a virtualized NAS and copying between virtualized NAS's can be performed. Data copying between the virtualized NAS's at the local site is also possible.

FIG. 16 shows the hardware block configuration according to this embodiment, and a plurality of virtualized VNAS units are mounted at the local site 110 and the remote site 120 respectively. VNAS-1 and VNAS-3 are virtualized NAS units at the local site 110. The primary volume 101, the virtual volume 102, the management information storage area 28A, and the configuration information table 28B are allocated from storage resources (the shared memory 28 and the HDDs 14) to each VNAS unit.

Furthermore, VNAS-2 and VNAS-4 are virtualized NAS units at the remote site 120. The replication volume 104, the management information storage area 28a, and the configuration information table 28b are allocated from the storage resources (the shared memory 28 and the HDDs 14) to each VNAS unit.

An area for recording the VNAS unit name as one piece of copy management information exists in the management information table and the configuration information table in order to distinguish one VNAS unit from another among the plurality of VNAS units. When the local operator downloads data of a snapshot to a tape, the local site ID, the VNAS unit name, the primary volume ID, and the snapshot name are recorded in the designated area in the data block of the tape.

Figure 17:
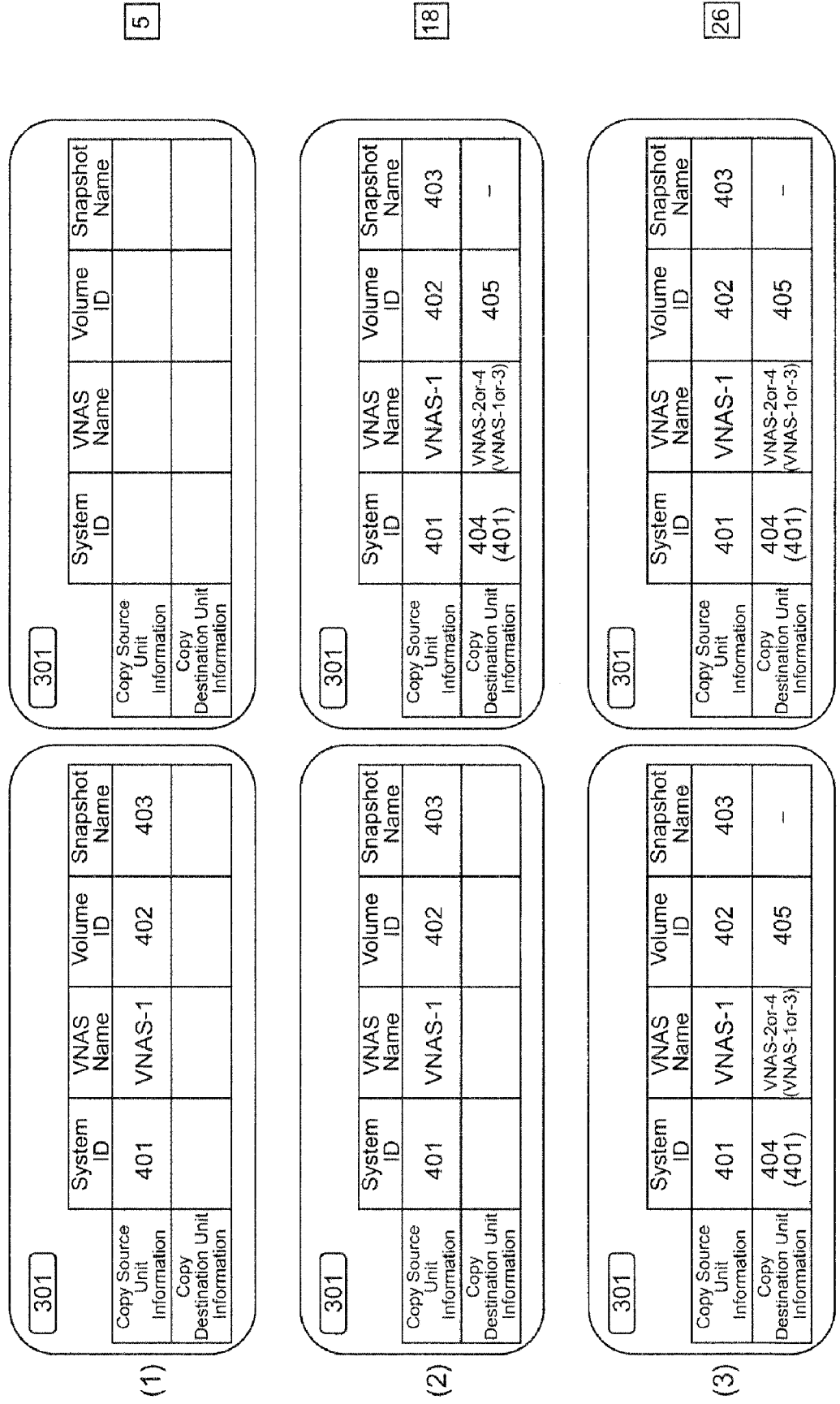
FIG. 17 is a block diagram explaining a transition of RUS configuration information tables at the local site and the remote site according to the embodiment in FIG. 16.

The configuration information table 301 for the copy source site and the configuration information table 302 for the copy destination unit at the end of step #5 as explained in the first embodiment are as shown in FIG. 17(1). It is assumed here that the copy source unit is VNAS-1 at the copy destination unit 110.

Incidentally, the copy source unit is not called a "local site" and the copy destination unit is not called a "remote site" as they are in the first embodiment because there is the embodiment in which a plurality of virtualized NAS units exist at the local site and data copying is performed between the virtualized NAS units within the local site.

FIG. 17(2) shows the configuration information tables in the copy source unit and the copy destination unit at the end of step #18. The remote site system ID 404 or the local site system ID 401 is recorded as the copy destination unit information.

The VNAS unit at the remote site (VNAS-2 or VNAS-4) or the VNAS unit at the local site (VNAS-3) is recorded as the VNAS name of the copy destination unit. The volume ID of a replication volume of the copy destination VNAS unit is described in the volume ID field.

Figure 18:
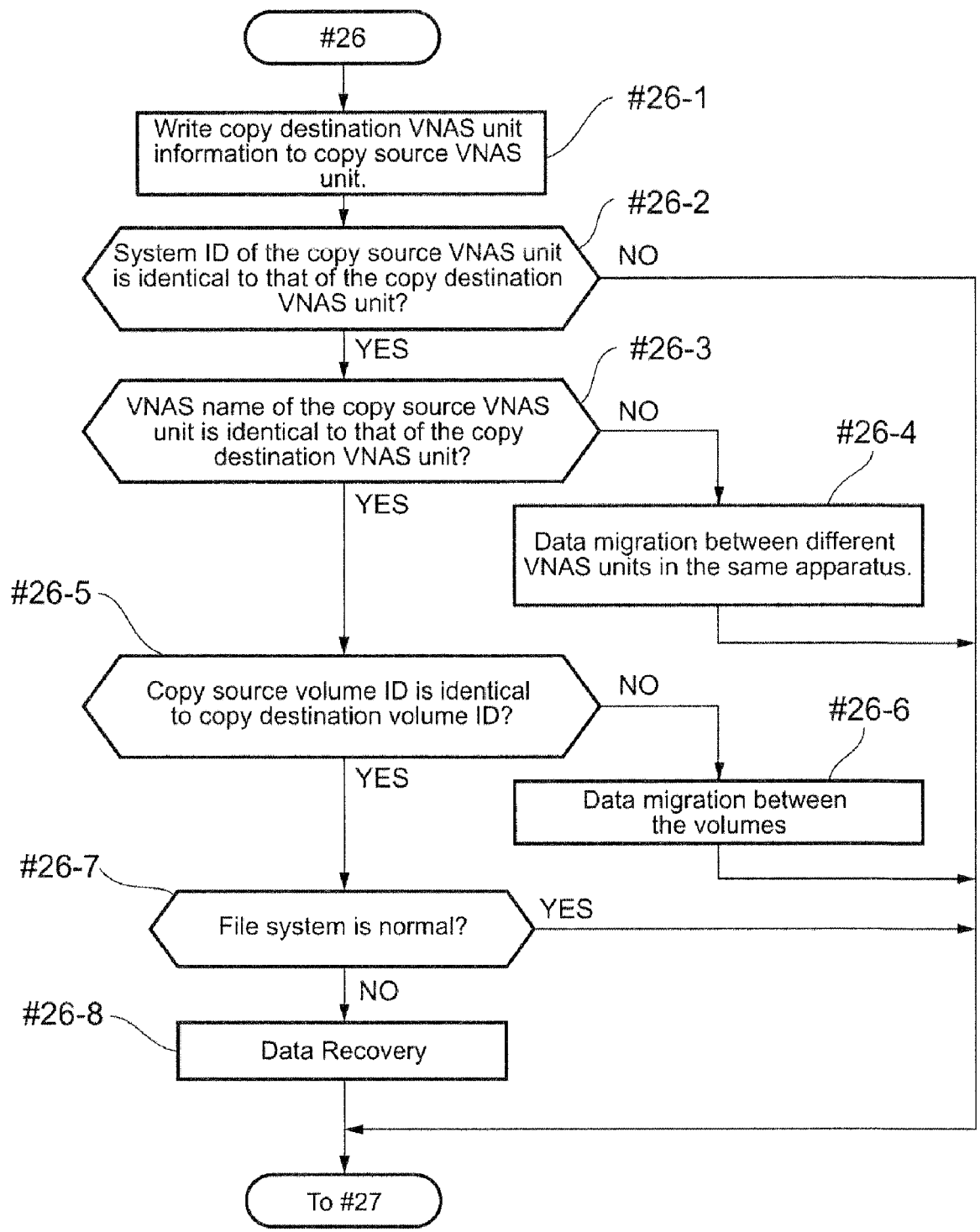
FIG. 18 is a block diagram explaining a characteristic operation according to the embodiment in FIG. 16.

If the backup processing program 212 allocated to the copy source VNAS unit in step #26 judges the replication volume in the copy destination VNAS unit to be a volume constituting an authentic pair with the copy source VNAS unit, it executes step #26-1 as shown in FIG. 18 and writes the system ID, VNAS name, and replication volume ID of the copy destination unit to the configuration information table for the copy source VNAS unit.

Next, the backup program judges in step #26-2 whether the system ID of the copy source VNAS unit is different from the system ID of the copy destination VNAS unit. If they are different, it means that the intend operation is copying data from the local site 110 to the remote site 120. Therefore, the processing proceeds to step #27 described in the first embodiment.

If it is determined that these IDs are identical to each other, the backup program compares the VNAS name of the copy source VNAS unit with the VNAS name of the copy destination VNAS unit in step #26-3. If it is determined that these VNAS names are different, it recognizes that the intended operation is data migration within the same apparatus, that is, from VNAS-1 to VNAS-3 at the local site (#26-4), and the backup program reads the entire data of a snapshot of the VNAS-1 unit from the magnetic tape medium, transfers the data to the volume of the VNAS-3 unit, and then proceeds to step #27.

On the other hand, if the backup program determines that the VNAS names are identical to each other, it recognizes that the intended operation is data transfer between volumes in the same VNAS, and then compares the copy source volume ID with the copy destination volume ID (#26-5). If the backup program determines that the copy source volume ID is different from the copy destination volume ID, it reads the entire data of the snapshot of the copy source volume and migrates it to the copy source volume (#26-6).

On the other hand, if it is determined that the IDs of these volumes are identical to each other, the backup program recognizes that the intended operation is data recovery of the copy source volume (the primary volume 101), and then checks if the status of the file system of the primary volume is normal or not (#26-7).

If the backup program determines that the file system is normal, it displays a message of cessation of the data recovery for the local operator on the management computer 18 and proceeds to step #27. On the other hand, if the backup program determines that the file system is abnormal, the local operator copies the tape data to the primary volume, executes the data recovery of the primary volume 101, changes the file system status to "normal," and then proceeds to step #27.

This embodiment makes it possible to copy data between a plurality of volumes by distinguishing the VNAS names and the VNAS IDs. Therefore, it is possible to apply this invention to a wide range of uses, for example, not only remote copying between a plurality of storage apparatuses, but also data migration between a plurality of volumes in the same storage apparatus and data recovery of the same volume.

The aforementioned embodiments have described the remote copying based on the RUS system. However, it is also possible to use this invention for asynchronous remote copying between a primary volume and a replication volume.

Incidentally, in the aforementioned embodiments, information at the local site and the remote site can be handled reliably and conveniently because the management information such as the system IDs and the volume IDs is stored in the same area at the same time; and this is favorable in terms of assurance of information security.

[Industrial Applicability]

The present invention can be utilized for data backup using portable storage media and can preferably be used for a remote copy system between a local site and a remote site and, at the same time, for data backup and data recovery at the local site.

REFERENCE SIGNS LIST

110 Local site (copy source storage site)
120 Remote site (copy destination storage site)
101 Primary volume (copy source volume: P-VOL)
102 Snapshot (virtual volume: V-VOL)
104 Replication volume (copy destination volume: R-VOL)
602 magnetic tape (portable storage medium)

The invention claimed is:

1. A replication system comprising:
a copy source storage site having a copy source volume;
a copy destination storage site having a copy destination volume; and
a communication line configured to connect the copy source storage site and the copy destination storage site,
wherein the copy source storage site includes:
a first memory configured to record management information in the copy source volume; and
a first controller configured to record the management information in the copy source volume, and to store data including the management information about the copy source volume in a portable storage medium,
wherein the management information includes system information about the copy source storage site and identification information about the copy source volume,
wherein the copy destination storage site includes:
a second memory; and
a second controller configured to read data of the copy source volume from the portable storage medium and storing it in the copy destination volume, and to read the management information from the data and storing it in the second memory, and
wherein the second controller sends the management information stored in the second memory to the copy source storage site via the communication line, and
wherein after collating the management information stored in the first memory with the management information sent from the second controller and receiving an affirmative judgment that the collated management information is authentic, the first controller sets a copy pair relationship to the copy source volume and the copy destination volume.

2. The system according to claim 1,
wherein the copy source storage site includes an operation volume configured to provide a host computer with a storage area,
wherein the first controller:
sets a snapshot of the operation volume as the copy source volume, reads data from, the snapshot, and stores it in a magnetic tape medium as the portable storage medium;
sets prohibition information for prohibiting deletion of the snapshot to a snapshot management table; and transfers data of periodic snapshots of the copy source volume to the copy destination volume by using the communication line and deletes the prohibition information from the snapshot management table after setting the copy pair relationship to the copy source volume and the copy destination volume, wherein the management information includes system information about the copy source storage site, identification information about the copy source volume, and a name of the snapshot, and the copy destination storage site accesses the copy source storage site based on the identification information and sends the management information in the second memory to the copy source storage site, and the first controller compares the management information in the first memory with the sent management information, wherein the second controller sends system information about the copy destination storage site and the copy destination volume information to the copy source storage site, and the first controller sets the copy pair relationship to the copy source volume and the copy destination volume based on these pieces of information, wherein the copy source storage site includes a file system configured to process a file configuration of the copy source volume, and a backup processing program, and if the backup processing program executes a command to back up data of the copy source volume to the portable storage medium, the file system sets a specified area in a file configuration of the copy destination volume, and the backup processing program records the management information in the specified area and backs up the entire data of the copy source volume including the management information to a file configuration of the portable storage medium, wherein the copy destination storage site includes a file system configure to back up data of the portable storage medium to the file configuration of the copy destination volume, and a backup processing program configured to back up the data of the portable storage medium to the copy destination volume, wherein the file system for the copy destination storage site recognizes the specified area for the data backed up in the copy destination volume, and the backup processing program for the copy destination storage site reads the management information from the specified area and records it in the second memory, wherein after receiving a command to load data of the copy source volume in the portable storage medium onto the copy destination volume, the second controller reads the management information from the specified area in the copy destination volume and sends the management information to the copy source storage site, and wherein the specified area is set to a specific area, from among a plurality of management information storage areas in the copy destination volume, that is recognized by both the file system for the copy source storage site and the file system for the copy destination storage site.

3. The system according to claim 1, wherein the copy source storage site includes an operation volume configured to provide a host computer with a storage area, and wherein the first controller:

sets a snapshot of the operation volume as the copy source volume, reads data from the snapshot, and stores it in the portable storage medium;

sets prohibition information for prohibiting deletion of the snapshot to a snapshot management table; and transfers data of periodic snapshots of the copy source volume to the copy destination volume by using the communication line and deletes the prohibition information from the snapshot management table after setting the copy pair relationship to the copy source volume and the copy destination volume.

4. The system according to claim 1, wherein the copy destination storage site accesses the copy source storage site based on the system information and sends the management information in the second memory to the copy source storage site, and wherein the first controller compares the management information in the first memory with the sent management information.

5. The system according to claim 1, wherein the second controller sends system information about the copy destination storage site and the copy destination volume information to the copy source storage site, and wherein the first controller sets the copy pair relationship to the copy source volume and the copy destination volume based on these pieces of information.

6. The system according to claim 1, wherein the copy source storage site includes a file system configured to process a file configuration of the copy source volume, and a backup processing program, wherein if the backup processing program executes a command to back up data of the copy source volume to the portable storage medium, the file system sets a specified area in a file configuration of the copy destination volume, and wherein the backup processing program records the management information in the specified area and backs up the entire data of the copy source volume including the management information to a file configuration of the portable storage medium.

7. The system according to claim 3, wherein the management information further includes a name of the snapshot.

8. The system according to claim 6, wherein the copy destination storage site includes a file system configured to back up data of the portable storage medium to a file configuration of the copy destination volume, and a backup processing program configured to back up the data of the portable storage medium to the copy destination volume, wherein the file system for the copy destination storage site recognizes the specified area for the data backed up in the copy destination volume, and wherein the backup processing program for the copy destination storage site reads the management information from the specified area and records it in the second memory.

9. The system according to claim 1, wherein after receiving a command to load data of the copy source volume in the portable storage medium onto the copy destination volume, the second controller reads the management information from the specified area in the copy destination volume and sends the management information to the copy source storage site.

10. The system according to claim 8, wherein the specified area is set to a specific area, from among a plurality of management information storage areas in the copy destination volume, that is recognized by both the file system for the copy source storage site and the file system for the copy destination storage site.

11. The system according to claim 3, further comprising:
a first storage apparatus;
a second storage apparatus;
a first virtual system; and
a second virtual system,
wherein the copy source storage site is constituted from the first virtual system,
wherein the copy destination storage site is constituted from the second virtual system,
wherein the first virtual system exists in the first storage apparatus and the second virtual system exists in the second storage apparatus,
wherein the copy source volume, the first memory, and the first controller are allocated to the first virtual system,
wherein the copy destination volume, the second memory, and the second controller are allocated to the second virtual system, and
wherein the management information includes system information about the first storage apparatus, identification information about the copy source volume, identification information about the first virtual system, and identification information about the snapshot.

12. The system according to claim 3, further comprising:
a first storage apparatus;
a second storage apparatus;
a first virtual system; and
a second virtual system,
wherein the copy source storage site is constituted from the first virtual system,
wherein the copy destination storage site is constituted from the second virtual system,
wherein the first controller includes the first memory, the second memory, the first controller, the second controller, the copy source volume, and the copy destination volume,
wherein the first virtual system and the second virtual system exist in the first storage apparatus,
wherein the copy source volume, the first memory, and the first controller are allocated to the first virtual system,
wherein the copy destination volume, the second memory for the first storage apparatus, and the second controller for the first storage apparatus are allocated to the second virtual system, and
wherein the management information includes system information about the first storage apparatus, identification information about the copy source volume, identification information about the first virtual system, and identification information about the snapshot.

13. The system according to claim 12,
wherein if it is determined that the identification information about the first virtual system to which the copy source volume belongs is different from identification information about the second virtual system to which the copy destination volume belongs, or if it is determined that the identification information about the first virtual system to which the copy source volume belongs is identical to the identification information about the second virtual system to which the copy destination volume belongs, and the identification information about the copy source volume is different from the identification information about the copy destination volume, the first controller copies data of the copy source volume stored in the portable storage medium to the copy destination volume, and
wherein if it is determined that the identification information about the copy source volume is identical to the identification information about the copy destination volume, the first controller checks a file system of the copy source volume; and if it is determined that the file system has a failure, the first controller recovers the copy source volume based on the data stored in the portable storage medium.

14. The system according to claim 1,
wherein if the capacity of the copy source volume exceeds a data capacity of the portable storage medium, the first controller divides the entire data of the copy source volume and stores the divided pieces of data into a plurality of portable storage media and the second controller sequentially reads the data of the copy source volume from the plurality of portable storage media and backs it up to the copy destination volume, and
wherein if the capacity of the portable storage medium exceeds the capacity of the copy source volume, the portable storage medium stores data of a plurality of copy source volumes belonging to the same copy source storage site or existing at different copy source storage site, and the second controller backs up the data of the copy source volume relative to the copy destination volume, from among the plurality of copy source volumes, to each of the plurality of copy destination volumes belonging to the copy destination storage site.

15. A replication control method for a replication system, the replication system comprising a copy source storage site having a copy source volume, and a copy destination storage site having a copy destination volume, the method comprising:
storing, by the copy source storage site, management information in the copy source volume; and
storing, by the copy source storage site, the entire data of the copy source volume including the management information in a portable storage medium,
wherein the management information includes system information about the copy source storage site and identification information about the copy source volume,
wherein the copy destination storage site further performs steps of:
reading the data of the copy source volume from the portable storage medium and storing it in the copy destination volume,
reading the management information from the copy destination volume; and
sending the management information to the copy source storage site, and
wherein the copy source storage site which has received the management information collates its own management information with the received management information, and after receiving an affirmative judgment that the collated management information is authentic, the copy source storage site then sets a copy pair relationship to the copy source volume and the copy destination volume.

* * * * *